US007921297B2

(12) United States Patent
Ortiz et al.

(10) Patent No.: US 7,921,297 B2
(45) Date of Patent: *Apr. 5, 2011

(54) RANDOM BIOMETRIC AUTHENTICATION UTILIZING UNIQUE BIOMETRIC SIGNATURES

(76) Inventors: Luis Melisendro Ortiz, Dallas, TX (US); Kermit Dean Lopez, Dallas, TX (US)

( * ) Notice: Subject to any disclaimer, the term of this patent is extended or adjusted under 35 U.S.C. 154(b) by 1499 days.

This patent is subject to a terminal disclaimer.

(21) Appl. No.: 10/321,872

(22) Filed: Dec. 17, 2002

(65) Prior Publication Data

US 2003/0163710 A1 Aug. 28, 2003

Related U.S. Application Data

(63) Continuation-in-part of application No. 09/757,903, filed on Jan. 10, 2001.

(51) Int. Cl.
*G06F 21/00* (2006.01)
*G06F 7/04* (2006.01)
(52) U.S. Cl. ............... 713/182; 713/186; 726/2; 726/3
(58) Field of Classification Search .......... 726/2, 5, 726/9, 19, 20, 3; 705/65, 67, 76, 18; 709/229; 382/115–127; 235/380, 382; 356/300, 76; 340/5.52, 5.53; 600/300, 301, 310; 713/182, 713/186, 185, 192

See application file for complete search history.

(56) References Cited

U.S. PATENT DOCUMENTS

| 5,229,764 | A | | 7/1993 | Matchett et al. ......... 340/825.34 |
| 5,291,560 | A | | 3/1994 | Daugman ..................... 382/2 |
| 5,469,506 | A | | 11/1995 | Berson et al. .................. 380/23 |
| 5,586,186 | A | | 12/1996 | Yuval et al. ..................... 380/30 |
| 5,617,082 | A | | 4/1997 | Denison et al. .......... 340/825.31 |
| 5,712,912 | A | | 1/1998 | Tomko et al. .................... 380/23 |
| 5,719,950 | A | * | 2/1998 | Osten et al. ................... 382/115 |
| 5,725,480 | A | * | 3/1998 | Oosta et al. ................... 600/310 |
| 5,737,439 | A | * | 4/1998 | Lapsley et al. ............... 382/115 |
| 5,751,836 | A | | 5/1998 | Wildes et al. ................. 382/117 |
| 5,787,187 | A | | 7/1998 | Bouchard et al. ............ 382/115 |

(Continued)

FOREIGN PATENT DOCUMENTS

EP  0 613 576 B1  6/1996

(Continued)

OTHER PUBLICATIONS

Malmsten, V., "Eye Scans—Authentication with Biometrics," Sans Institute, Information Security Reading Room, Nov. 21, 2000.

(Continued)

*Primary Examiner* — Hosuk Song
*Assistant Examiner* — Suman Debnath
(74) *Attorney, Agent, or Firm* — Kermit D. Lopez; Luis M. Ortiz; Ortiz & Lopez, PLLC

(57) ABSTRACT

A user can be challenged to provide at least one randomly selected biometric attribute. The randomly selected biometric attribute input by the user is automatically compared to a plurality of biometric attributes of the user contained in a user profile. The user can then be authenticated if the randomly selected biometric attribute input by the user matches at least one of the plurality of biometric attributes of the user contained in the user profile. Biometric attributes analyzed according to the methods and systems of the present invention, include, but are not limited to, for example, fingerprints, iris, retina, and/or tissue characteristics, such as skin morphology, skin layer thickness, collage density and orientation, tissue hydration, optical patent length differences, etc.

28 Claims, 19 Drawing Sheets

U.S. PATENT DOCUMENTS

| | | | | |
|---|---|---|---|---|
| 5,790,668 | A | * | 8/1998 | Tomko .......................... 713/186 |
| 5,802,199 | A | | 9/1998 | Pare, Jr. et al. ................ 382/115 |
| 5,806,040 | A | * | 9/1998 | Vensko ......................... 704/273 |
| 5,815,252 | A | * | 9/1998 | Price-Francis .................. 356/71 |
| 5,842,194 | A | | 11/1998 | Arbuckle ........................ 706/52 |
| 5,886,644 | A | | 3/1999 | Keskin et al. ............ 340/825.31 |
| 5,894,277 | A | | 4/1999 | Keskin et al. ............ 340/825.31 |
| 5,901,238 | A | | 5/1999 | Matshushita ................. 382/117 |
| 5,915,035 | A | | 6/1999 | Hsiao et al. ................... 382/125 |
| 5,956,122 | A | | 9/1999 | Doster .......................... 351/210 |
| 5,973,624 | A | | 10/1999 | Miller et al. .................... 341/35 |
| 5,991,408 | A | | 11/1999 | Pearson et al. .................. 380/23 |
| 5,995,642 | A | | 11/1999 | Hsu et al. ...................... 382/124 |
| 6,011,858 | A | | 1/2000 | Stock et al. ................... 382/115 |
| 6,012,064 | A | | 1/2000 | Gibbons et al. .............. 707/103 |
| 6,016,476 | A | | 1/2000 | Maes et al. ........................ 705/1 |
| 6,018,739 | A | | 1/2000 | McCoy et al. ................ 707/102 |
| 6,038,315 | A | | 3/2000 | Strait et al. ...................... 380/23 |
| 6,038,332 | A | | 3/2000 | Fishbine et al. .............. 382/115 |
| 6,038,334 | A | | 3/2000 | Hamid .......................... 382/124 |
| 6,038,666 | A | | 3/2000 | Hsu et al. ...................... 713/186 |
| 6,047,281 | A | | 4/2000 | Wilson et al. ..................... 707/3 |
| 6,047,282 | A | | 4/2000 | Wilson et al. ..................... 707/3 |
| D426,237 | S | | 6/2000 | Wranne ....................... D14/385 |
| 6,072,891 | A | | 6/2000 | Hamid et al. ................. 382/116 |
| 6,092,192 | A | | 7/2000 | Kanevsky et al. ............ 713/186 |
| 6,105,010 | A | | 8/2000 | Musgrave ....................... 705/44 |
| 6,108,636 | A | | 8/2000 | Yap et al. .......................... 705/5 |
| 6,111,977 | A | | 8/2000 | Scott et al. .................... 382/124 |
| 6,119,096 | A | | 9/2000 | Mann et al. ....................... 705/5 |
| 6,140,939 | A | | 10/2000 | Flick ........................ 340/825.69 |
| 6,154,879 | A | | 11/2000 | Pare, Jr. et al. ................... 902/3 |
| 6,160,903 | A | | 12/2000 | Hamid et al. ................. 382/115 |
| 6,167,517 | A | * | 12/2000 | Gilchrist et al. .............. 713/186 |
| 6,256,737 | B1 | * | 7/2001 | Bianco et al. ................. 713/186 |
| 6,360,953 | B1 | * | 3/2002 | Lin et al. ....................... 235/492 |
| 6,697,947 | B1 | * | 2/2004 | Matyas et al. ................ 713/182 |
| 6,735,695 | B1 | * | 5/2004 | Gopalakrishnan et al. ... 713/186 |
| 6,751,734 | B1 | * | 6/2004 | Uchida ......................... 713/186 |
| 6,819,219 | B1 | * | 11/2004 | Bolle et al. .................... 340/5.52 |
| 6,829,375 | B1 | * | 12/2004 | Higuchi ........................ 382/124 |
| 6,871,242 | B1 | * | 3/2005 | Ho-Lung et al. ............... 710/16 |
| 6,944,773 | B1 | * | 9/2005 | Abrahams ..................... 713/168 |
| 2002/0138768 | A1 | | 9/2002 | Murakami et al. ........... 713/202 |
| 2002/0164058 | A1 | | 11/2002 | Aggarwal et al. ............ 382/125 |
| 2002/0183624 | A1 | | 12/2002 | Rowe et al. ................... 600/476 |
| 2004/0002894 | A1 | * | 1/2004 | Kocher .......................... 705/13 |

FOREIGN PATENT DOCUMENTS

| | | |
|---|---|---|
| EP | 0 752 143 81 | 12/1997 |
| EP | 0 630 504 B1 | 5/2000 |
| WO | WO 00/54214 | 9/2000 |

OTHER PUBLICATIONS

Zdenek, et al., "Biometric Authentication Systems," FI MU Report Series, FIMU-RS-2000-08, Nov. 2000.
Furusawa, M., "Advanced Encryption Standard (AES) Perspective and Strategies," Consumer Direct Link, Inc., Oct. 22, 2000, pp. 1-5.
McDowall, R.D., "Biometrics: The Password You'll Never Forget," LC GC Europe, Oct. 2000.
Bohm, et al., "Electronic Commerce: Who Carried The Risk of Fraud?" 2000 (3) The Journal of Information, Law and Technology (JILD), Oct. 31, 2000 http://elj.warwick.ac.uk/jilt/00-3/bohm.html.
"Who Goes There? Biometric Technologies Make You Your Best ID," How Computers Work, Part II, vol. 4, Issue 3, Aug. 2000, pp. 107-113.
Bracco, T., "Biometrics suites earn a thumbs up," Network World, vol. 17, No. 19, May 8, 2000.
Recktenwald, J., "Electronic authentication technology takes off," TechRepublic, Apr. 26, 2000.
Cambier J., "Biometric Identification in Large Populations," Information Security Bulletin, Mar. 2000, pp. 17-26.
Pankanti et al., "Biometrics: The Future of Identification," Computer, IEEE, Feb.2000, pp. 46-49.
Phillips et al., "An Introduction to Evaluating Biometric Systems," Computer, IEEE, Feb. 2000, pp. 56-63.
Reynolds et al., "Automatic Speaker Recognition," Humans, Computers and Speech Symposium, AAAS 2000 Meeting, Feb. 19, 2000.
Negin et al., "An Iris Biometric System for Public and Personal Use," Computer, IEEE, Feb. 2000, pp. 2-7.
Biometrics Working Group, "Best Practices in Testing and Reporting of Biometric Devices," Version 1.0, Jan. 12, 2000.
Bowman, E., "Everything You Need to Know About Biometrics," Identix Corporation, Jan. 2000.
Daugman, J., "Biometric Decision Landscapes," University of Cambridge, The Computer Laboratory, UCAM-CL-TR-482, Jan. 2000.
Prevost, J., "Biometrics With Limited Government Intervention: How to Provide for Privacy and Security Requirements of Networked Digital Environments," MIT 6.805/STS085: Ethics and Law on the Electronic Frontier, Fall 1999.
Schneier, B., "Security in the Real World: How to Evaluate Security Technology," Computer Security Journal, vol. XV, No. 4, 1999, pp. 1-14.
Haahr, M., "Introduction to Randomness and Random Numbers," Random.org, Jun. 1999, http://www.random.org/essay/html.
Lee et al., "A 600-dpi Capacitive Fingerprint Sensor Chip and Image-Synthesis Technique," IEEE Journal of Solid-State Circuits, vol. 34, No. 4, Apr. 1999, pp. 469-475.
Jun et al., "The Intel Random No. Generator," Cryptography Research, Inc., White Paper Prepared for Intel Corporation, Apr. 22, 1000.
Soutar, C. "Biometric system performance and security," Mytec Technologies. Inc., IEEE Workshop on Automatic Identification Advanced Technologies (AutoID '99), Sep. 1999, pp. 1-7.
Roddy et al., "Fingerprint Features—Statistical Analysis and System Performance Estimates," Feb. 10, 1999, pp. 1-64.
Boneh, D., "Twenty Years of Attacks on the RSA Cryptosystem," Notices of the AMS, Feb. 1999, pp. 203-213.
Grosse, P., "SignCrypt: Biometric Verification,"Quintet, Inc., Feb. 1999, pp. 1-5.
Ankari, "BioMouse Plus, Biometric and Smart Card User Anthentication," Discussion Paper, Jan. 1999.
"Biometric Encrytion," Ch. 22, ICSA Guide to Cryptography, Edited by R. Nichols, McGraw-Hill (1999).
Ashbourn, J., "The Biometric White Paper," pp. 1-14, http://homepage.ntlword.com/avanti/whitepaper.htm.
Woodward Jr., J., "DSS's Biometric ID Project," Testimony of John D. Woodward, Jr., For the Hearing of the Subcommittee on Domestic and International Monetary Policy, Committee on Banking and Financial Services, U.S. House of Representatives One Hundred Fifth Congress On "Biometrics and the Future of Money," May 20, 1998, pp. 1-11.
Schneier B., "Security Pitfalls in Cryptography," Counterpane Systems, 1998, pp. 1-11.
Van Natta et al., "Biometric Solutions to Personal Identification: A White Paper Describing Technologies Available for Establishing and Maintaining Your Identity in Cyberspace," Digital Persona, Providers of U.are.U, Fingerprint Recongnition System, Jan. 1998, pp. 1-22.
Carver, C., "Information Warfare: Task Force XXI or Task Force Smith," Military Review, Sep.-Nov. 1998, pp. 26-30.
Avolio, F., "Identity Confirmed: Token, smart card and biometric authentication schemes are making their way from the movies to the mainstream," Network World, Aug. 24, 1998.
Page, D., "Biometrics: Facing Down the Identity Crisis," High Technology Careers Magazine, Feature Presentation, 1998, http://www.hightechcareers.com/doc198/biometrics198.html.
Jueneman et al., "Biometrics and Digital Signatures in Electronic Commerce," 38 Jurimetrics, Spring 1998, pp. 1-31.
Jain et al., "On-Line Fingerprint Verification," Nov. 26, 1996, pp. 1-36.
Tomko. G., "Biometric Encryption: New Developments in Biometrics," 18$^{th}$ International Privacy and Data Protection Conference, Sep. 19, 1996.
Menezes et al., "Chapter 5: Pseudorandom Bits and Sequences," Handbook of Applied Cryptography, CRC Press, 1996, pp. 169-190.

\* cited by examiner

RANDOM BIOMETRIC AUTHENTICATION UTILIZING UNIQUE BIOMETRIC SIGNATURES

CROSS REFERENCE TO RELATED PATENT APPLICATION

This is a continuation-in-part of U.S. patent application Ser. No. 09/757,903, which was filed on Jan. 10, 2001 is now incorporated herein by reference in its entirety.

TECHNICAL FIELD OF THE INVENTION

The present invention relates to user biometric authentication and methods or systems for security of or through electronic systems. Electronic systems that can be secured using biometric technology include computers, kiosks, wireless devices, associated fixed and wireless networks, retail points-of-sale (POS), automatic teller machines (ATMs) and electromechanical systems, such as those used for physical security of buildings and perimeters, heavy equipment, motor vehicles and firearms. The present invention also relates to the use of biometric data for authenticating user identity and providing secure user access to data as well as authorizing transactions.

BACKGROUND OF THE INVENTION

Security for electronic and mechanical systems has rapidly become an important issue in recent years. With the proliferation of computers, computer networks and other electronic device and networks into all aspects of business and daily life, the concern over secure file and transaction access has grown tremendously. The ability to secure data and transactions is particularly important for financial, medical, education, government, military, and communications endeavors.

Using passwords is a common method of providing security for electrical or mechanical systems. Password protection and/or combination type locks are employed for computer network security, automatic teller machines, telephone banking, calling cards, telephone answering services, buildings, factories, houses and safes. These systems generally require the knowledge of an entry code that has been selected by or provided to a user or has been configured in advance.

Pre-set codes are often forgotten, however, as users have no reliable method of remembering them. Writing down codes and storing them in close proximity to an access control device (e.g., a combination lock) results in an insecure access control system. Alternatively, the nuisance of trying several code variations generally renders the access control system more of a problem than a solution.

Password systems are known to suffer from other disadvantages. Usually, a user specifies passwords. Most users, being unsophisticated users of security systems, choose passwords that are relatively insecure. As such, many password systems are easily accessed through a simple trial and error process.

To secure access to physical areas, such as buildings, the most common building security system relied on traditionally has been a security guard. A security guard reviews identification cards and compares pictures thereon to a person carrying the card. The security guard provides access upon recognition or upon other criteria. Other building security systems use card access, password access, or another secure access approach. Unfortunately, passwords and cards have similar drawbacks when utilized for building security, particularly with computer security.

As computer networks are increasingly used to link remote computer systems together, applications have been developed to allow a user on a remote client computer system to access a service on a host computer system. For example, a user on a client system may be able to access information contained in a database associated with a host computer system. Unfortunately, along with increased accessibility comes increased potential for security breaches. For example, communications, including authentication, between a client system and a host system can be intercepted and tampered with while in transit over the computer network. This may allow third parties or malicious users on a client computer system to gain access to, or security codes for, a service on a host computer system without proper authorization.

A number of systems have been developed to ensure that users do not gain unauthorized access to host computer systems. As explained above, some systems prompt a user for passwords. Such systems may also rely on PIN numbers, before granting the user access to the host computer system. As indicated above, however, passwords and PIN numbers may be forgotten or may fall into the wrong hands. Additionally, using passwords and PIN numbers for security purposes places an additional burden on institutions because passwords or PIN numbers require additional machinery and human resources to deal with customers when customers forget passwords or PIN numbers, or when customers request that passwords or PIN numbers be changed.

As an alternative to traditional security approaches, such as security guards, passwords or PIN numbers, biometric authentication systems have been developed to authorize accesses to various electronic and mechanical systems. Biometrics can generally be defined as the science of utilizing unique physical or behavioral personal characteristics to verify the identity of an individual. Biometric authentication systems are typically combined with hardware and software systems for automated biometric verification or identification. Biometric authentication systems receive a biometric input, such as a fingerprint or a voice sample, from a user. This biometric input is typically compared against a prerecorded template containing biometric data associated with the user to determine whether to grant the user access to a service on the host system.

A biometric security access system can thus provide substantially secure access and does not require a password or access code. A biometric identification system accepts unique biometric information from a user and identifies the user by matching the information against information belonging to registered users of the system. One such biometric system is a fingerprint recognition system.

In a fingerprint biometric system input transducer or sensor, the finger under investigation is usually pressed against a flat surface, such as a side of a glass plate; the ridge and valley pattern of the finger tip is sensed by a sensing means such as an interrogating light beam. In order to capture an image of a fingerprint, a system may be prompted through user entry that a fingertip is in place for image capture. Another method of identifying fingerprints is to capture images continuously and to analyze each image to determine the presence of biometric information such as a fingerprint.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface. In other cases, the illumination surface may be parallel to the first surface. Fingerprint identification devices of this nature are generally used to control the building-access or information-access of individuals to buildings, rooms, and devices such as computer terminals.

Before the advent of computers and imaging devices, research was conducted into fingerprint characterization and identification. Today, much of the research focus in biometrics has been directed toward improving the input transducer and the quality of the biometric input data. Fingerprint characterization is thus generally well known and can involve many aspects of fingerprint analysis.

For doorway security systems, biometric authentication systems have many known problems. For example, a user identification code, a PIN, is generally required to identify each individual in order to permit comparison of the biometric information and a single user's template. Remembering a PIN can be inconvenient and electromechanical device (e.g., keypad) needed to accept a PIN are sometimes subject to damage and failure. The device is also an additional equipment expense for a multiple entry access system.

Because a single processor can provide processing for several doors, for a multiple doorway system, the enterprise-side deployment of multiple equipment such as a biometric reader and a PIN entry unit will result in a significant portion of the overall system maintenance and associated cost. It would be advantageous to provide a system wherein provision of a PIN is not always necessary for identification. To date most biometric authentication systems or services rely on some form of PIN input device or a card reader, which also typically requires mechanical-mechanical operation (e.g., card swipe or slot entry) and hardware redundancy.

In evaluating security of biometric authorization systems, false acceptance and false rejections are sometimes evaluated as a fraction of a user population. A security system may be characterized as allowing 1 in 1,000 false acceptances or, alternatively, 1 in 1,000,000. Typically a probability distribution curve establishes a cut off for a given registration to determine what false acceptance rate this reflects. Curves of this type are exponential in nature and, therefore, for better false acceptance rates provide only nominal improvements to false acceptance rate for significant changes to a threshold value. Typically when using a biometric information sample, a low match score results in failure to authorize an individual.

In the past, a one-to-many search of biometric information has generally been considered undesirable because security may be compromised. For example, when a single biometric template is compared and a resulting comparison having an approximately $1/1,000,000$ likelihood of false acceptance is desired, it should be clear that approximately $1/1,000,000$ users may be misidentified. When, however, a forty-user system is provided with equivalent individual comparison criteria, the probability of false acceptance can escalate to $1-(0.999999)^{40}$, which is approximately $1/25,000$. Whereas $1/1,000,000$ is generally acceptable for many applications, $1/25,000$ is likely not as acceptable. Further, as the number of individual templates grows, the rate of false acceptance increases; when 250 templates exist, a likelihood of about $1/4,000$ of false acceptance exists.

In order to solve this problem, one might reduce the false acceptance rate to $1/10,000,000$; however, this results in problems identifying some people and makes such a system inconvenient. A system of this type is unlikely to provide consistent results and therefore, requires a security guard at least at a door to provide access for those who are not identifiable to $1/10,000,000$.

Another potential problem with the use of biometrics is related to the unauthorized interception of a digital signal or file representing a biometric (i.e., similar to unauthorized interception of passcodes/passwords). An unauthorized user may substitute a digital signal of a biometric attribute or template by bypassing biometric readers or scanners altogether. Therefore, like passwords or passcodes, use of biometrics for security purposes and user authorization, verification, and identification of data is not completely full proof.

Based on the foregoing, those skilled in the art can appreciate that despite the advances in biometric authentication, most biometric authentication systems are still plagued with various physical and electronic drawbacks. It is believed that the biometric methods and systems disclosed herein overcome many drawbacks known in the art.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

The inventors provide new methods and systems for user biometric authentication and for enhanced security of or access through electronically controlled systems (hereinafter referred to as "electronic systems"). Electronic systems that can be secured using the present biometric technology include computers, kiosks, wireless devices, associated fixed and wireless networks, retail points-of-sale (POS), automatic teller machines (ATMs) and mechanical-mechanical systems, such as those used for physical security of buildings and perimeters, heavy equipment, motor vehicles and firearms.

It is a feature of the present invention enable the use of biometric data for authenticating user identity, whereby a properly authenticated user can be provided access to or through electronic systems, including providing secure user access to data, facilities and transactions.

It is therefore, one aspect of the present invention, to provide an improved biometric authentication methods and systems for providing authenticated user access to or through electronic systems by randomly challenging the user for at least one biometric sample.

It is another aspect of the present invention, to provide an improved biometric authentication methods and systems for providing authenticated user access to or through electronic systems by randomly challenging the user for at least one biometric sample provided through a multiple biometric input unit.

It is another aspect of the present invention, to provide an improved biometric authentication methods and systems for providing authenticated user access to or through electronic systems by randomly challenging the user for at least one biometric sample provided through a multiple biometric input unit, wherein the multiple biometric unit includes at least two of: fingerprint, voice, eye-related, facial, skin or tissue characteristic (e.g., skin luminescence), written (e.g., signature), biomedical (e.g., heart rate), hand geometry, and facial geometry.

It is another aspect of the present invention, to provide an improved biometric authentication methods and systems for providing authenticated user access to or through electronic systems by accepting at least one biometric sample provided through a multiple biometric input unit, wherein the multiple biometric unit includes at least two of: fingerprint, voice, eye-related, facial, skin or tissue characteristic (e.g., skin luminescence), written (e.g., signature), biomedical (e.g., heart rate), hand geometry, and facial geometry.

It is yet another aspect of the present invention to provide biometric authentication methods and systems based on the retrieval and/or selection of biometric attributes associated with a user profile, which can contain biometric information about the user in addition to other user-related data.

It is yet another aspect of the present invention to provide systems and methods providing biometric template retrieval in advance of biometric authentication, including retrieval and/or selection of biometric attributes associated with a user profile containing biometric information about the user and can include other user-related data.

The above and other features of the invention can be achieved where a user is challenged to provide at least one biometric attribute that can be randomly selected by a security system. The randomly selected biometric attribute input by the user is can be compared automatically to a plurality of biometric attributes associated with the user and contained in the user's stored profile. The user can then be authenticated if the randomly selected biometric attribute input by the user matches at least one of a plurality of biometric attributes contained in the user profile. The "authenticated" user can then be permitted access to or through an electronic system.

The user profile can contain at least one of the following biometric attributes of the user: fingerprint data, iris data, retina data, skin characteristics, voiceprint information, hand geometry, facial information, and physical signature characteristics. The user profile can also include at least one of the following biometric skin attributes of the user: thickness of skin layers, morphology of skin interfaces, scattering properties due to collagen density and orientation, sex and age related compositional differences of skin, tissue hydration, and optical path length differences.

A skin or tissue sensor can also be utilized in accordance with particular embodiments of the present invention. Such a skin or tissue sensor can be configured as a system or device for collecting spectral information from tissue for performing biometric tasks. The skin or tissue sensor can include a plurality of discrete light sources, means for directing light into the tissue, means for detecting light that substantially passed through sub-surface tissue, means for recording and storing resulting detector signals, and means for processing resulting spectral data to perform a biometric determination.

A biometric authentication system in accordance with another feature of the present invention can include a hardware unit for providing authenticated user access (whether input is random, or provided without regard to challenge features of the invention) to or through electronic systems by accepting at least two biometric samples associated with a finger from a single interface. A biometric reader can accept a user's finger onto a reading unit, which can simultaneously obtain at least two biometric readings in any combination from the following: fingerprint characteristics, skin or tissue characteristics, and/or biomedical (e.g., heart rate). The reading area associated with the hardware unit has integrated sensors capable of accepting simultaneous input. A hand geometry hardware unit, which is well known in the art, can also provide more than two biometric samples to an authentication system, simultaneously.

Biometric authentication systems and methods in accordance with other features of the present invention can include systems and methods providing advanced template retrieval (whether input is random, or provided without regard to challenge features of the invention). Advanced template retrieval systems and methods can be used to automatically retrieve biometric information associated with a user when a user's presence is detected near a biometric authentication station.

Wireless communication between a network having wireless transceivers (e.g., wireless access points) deployed near biometric authentication stations can achieve communication with a transceiver associated with users, including: RFID tags (e.g., RFID-enabled identification badges, retail bank cards, or RFID tags adhered to user controlled objects) and mobile handheld devices (e.g., mobile phones and PDAs). The network can identify a user's proximity within a set perimeter/distance of an electronic system requiring biometric authentication. Such a system is useful, for example, when associated with a point-of-sale or a secured entry where the user is waiting in line to conduct a transaction requiring biometric authentications (e.g., retail sale, border entry, boarding public transportation).

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

The following description is presented to enable a person skilled in the art to make and use the invention, and is provided in the context of particular applications and its requirements. Various modifications to the disclosed embodiments will be readily apparent to those skilled in the art after full appreciation of the following disclosure, and it should be appreciated that the general principles described herein can be applied to other related devices, systems, methods and applications without departing from the spirit and scope of the present invention.

Thus, the present invention is not intended to be limited to the embodiments shown, but is to be accorded the widest scope consistent with principles and features disclosed herein. Although preferred embodiments of the present invention are described herein, those skilled in the art can appreciate that a number of varying embodiments can be implemented in accordance with the present invention.

Figure 1:
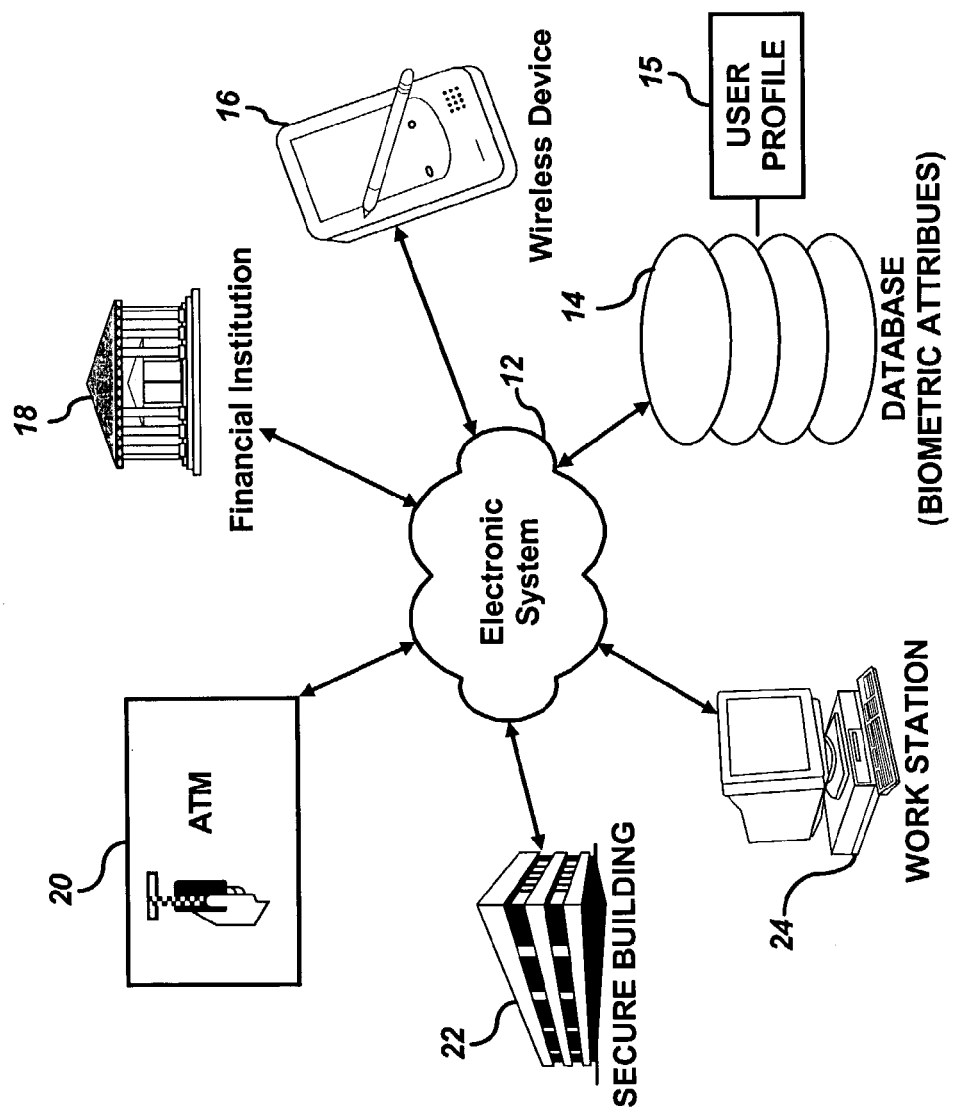
FIG. 1 depicts a block diagram illustrating components of an electronic system associated with a database containing biometric attributes in which preferred embodiments of the present invention can be implemented.

FIG. 1 depicts a block diagram illustrating components of an electronic system 12 associated with a database or memory containing biometric attributes 14, in which preferred embodiments of the present invention can be implemented. Database 14 can be linked or integrated with electronic system 12 and can include a at least one user profile 15 containing biometric templates (i.e., samples) of biometric attributes provided previously by particular users. Electronic system 12 can interact with and communicate with a variety of devices and mechanical systems.

Electronic system 12 can, for example, communicate with a computer workstation 24. In such an example, electronic system 12 can be configured as a remote computer network (e.g., the Internet), or a dedicated computer network (e.g., Intranet, WLAN, LAN, etc.) operating within a particular organization, business or institution. Electronic system 12 can also be configured to communicate with electro-mechanical systems, such as entry hardware of a secure building 22. A user can access electronic system 12 to secure entry to secure building 22. In some applications, electronic system 12 can be configured as electronics associated with or resident within the user interface (e.g., typical of non-networked systems, such as secure entries).

Additionally, electronic system 12 can be configured to communicate with an Automatic Teller Machine (ATM) 20 and/or point of sale. A user attempting to retrieve cash through ATM 20 can be required to authentication his or her identification, based on previously stored biometric attributes contained within database 14 and/or user profile 15. Database 14 and user profile 15 can function as a biometric broker that communicates as a third-party service with various mechanical systems and other devices through electronic system 12. Electronic system 12 can also enable communication with a financial institution 18 and wireless device 16.

In order to communicate with wireless device 16, electronic system 12 can be configured as part of a wireless network. A wireless device 16 can be, for example, a wireless telephone or a wireless hand held device that can communicate with wireless networks to send and receive data. Wireless device 16 can be, for example, a Wireless Application Protocol (WAP) enabled communications device configured to authenticate the identity of a user through a biometric scanner integrated with or attached to the wireless device.

Figure 2:
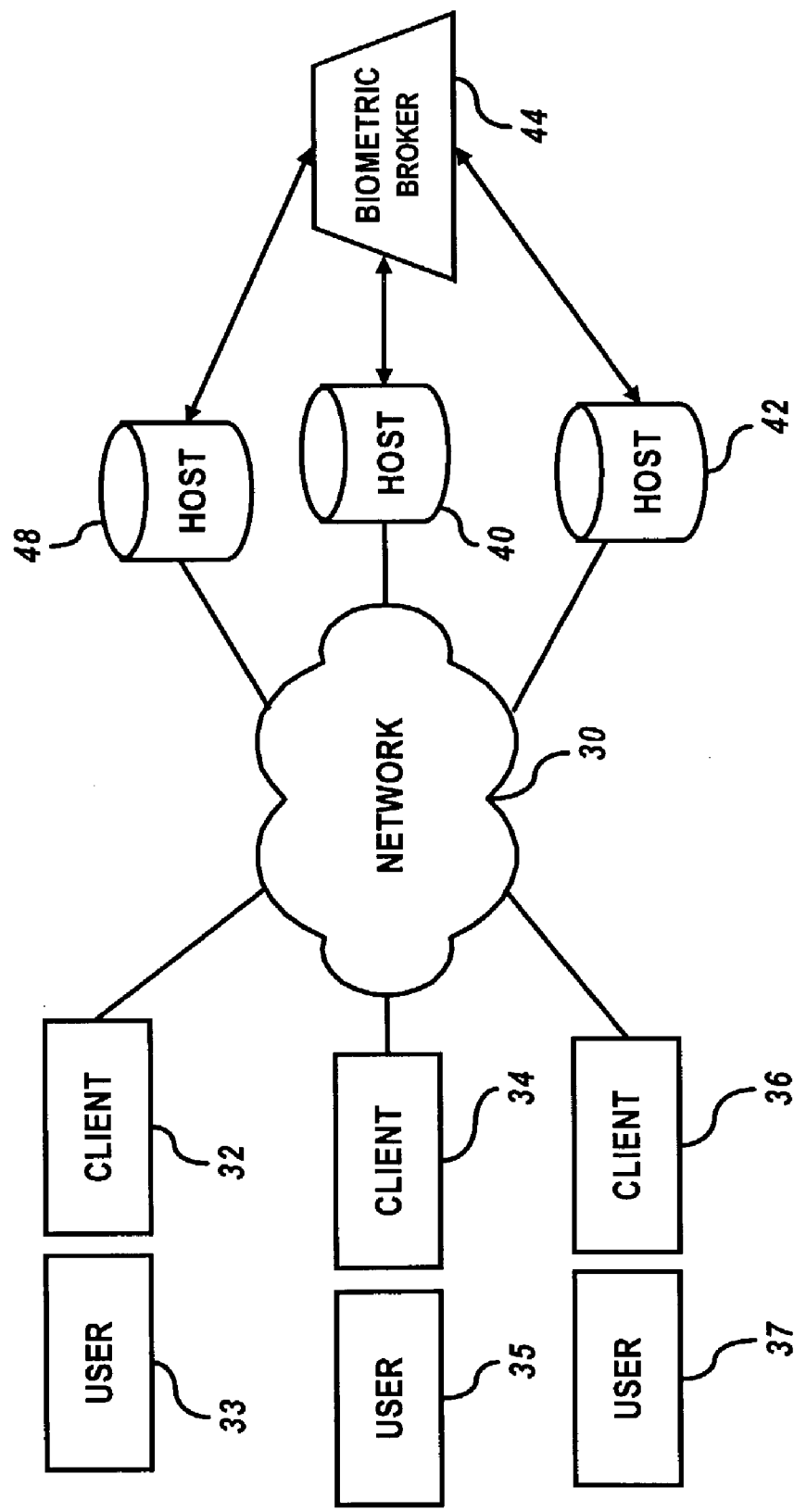
FIG. 2 illustrates a diagram illustrating client computer systems coupled to host systems through a network in which preferred embodiments of the present invention can be implemented.

FIG. 2 illustrates a diagram illustrating client computer systems 32, 34, and 36 coupled to host computer systems 48, 40, and 42 through a network 30, in which preferred embodiments of the present invention can be implemented. Network 30 can be any communication channel through which computer systems can communicate. This includes, but is not limited to, local area networks, such as Ethernet or Token ring, and wide area or remote computer networks, such as the Internet and World Wide Web, well known in the networking arts.

Network 30 can also be implemented as a wireless network through which wireless devices, such as wireless device 16 of FIG. 1, can communicate with other devices and other systems. A client, such as client systems 32, 34, and 36 can be any node on a computer network including computational capability and including a mechanism for communication across network 30. Human users 33, 35, and 37 can operate client systems 32, 34, and 36, respectively. A host, such as host systems 48, 40 and 42, can be any node on a computer network including a mechanism for servicing requests from a client for computational or data storage resources. Hosts can also be implemented as servers.

Figure 4:
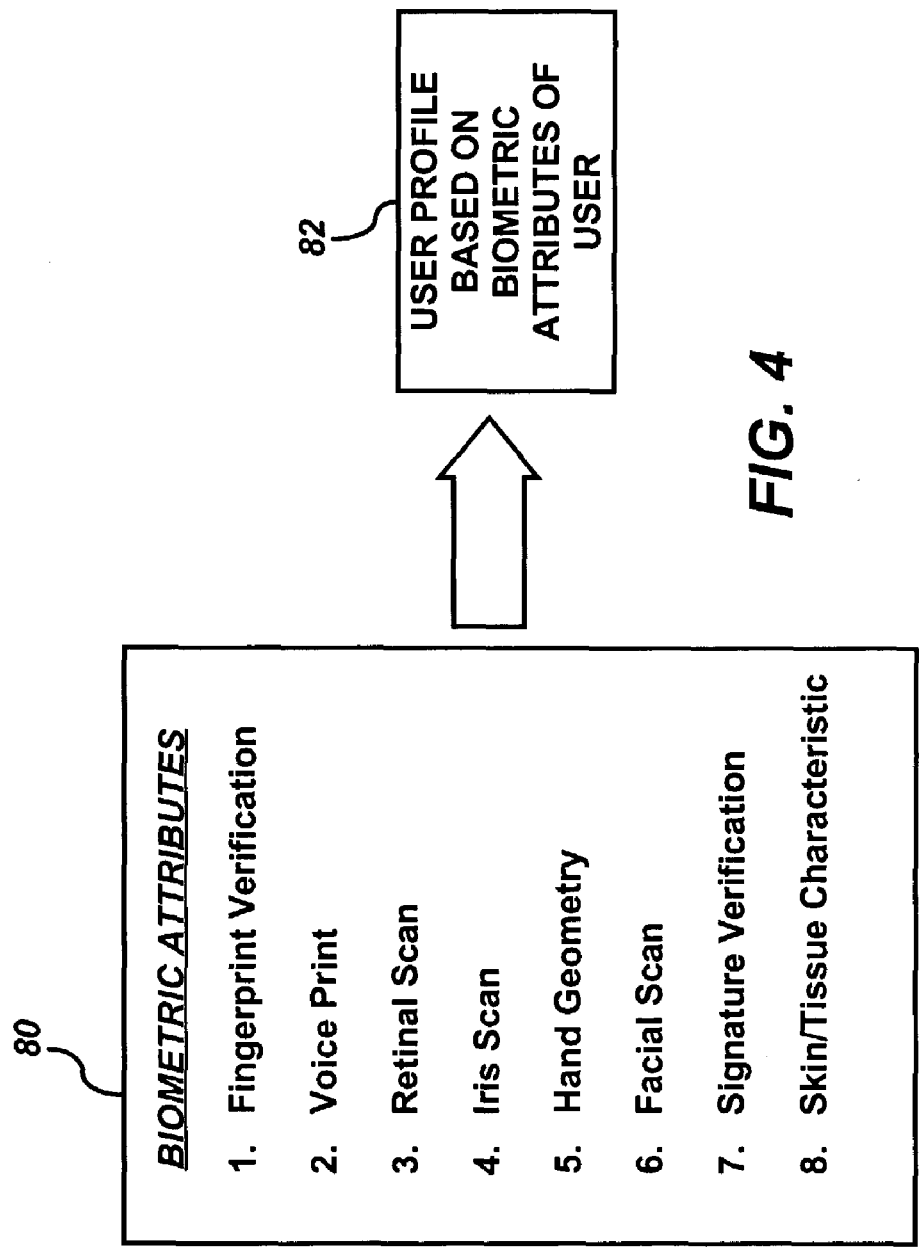
FIG. 4 depicts a diagram illustrating biometric attributes and a user profile, which can be utilized in accordance with preferred embodiments of the present invention.

Host systems 48, 40 and 42 can be coupled to biometric broker 44. Biometric broker 44 can be implemented as a centralized repository for storing biometric attributes (i.e., biometric data), such as fingerprint data. Biometric broker 44 can also be configured as an entity that obtains biometric data form a variety of biometric databases operated by different entities and organizations, and utilizes such information for authentication purposes. FIG. 4, which will be further described herein, lists examples of biometric data that can be utilized in accordance with the present invention. Biometric broker 44 can also include a mechanism for managing the biometric attributes stored as data, and can additionally include a mechanism for implementing security policies for the biometric attributes. Such policies can require specific levels of authentication for different groups of users, or for access to different servers.

Biometric brokers 44 can be implemented in any number of forms. In one possible embodiment, biometric broker 44 can be implemented as a node on network 30, which communicates with host systems 48, 40, and 42 across network 30. In another possible embodiment, biometric broker 44 can be located on a host, such as host system 48.

The example illustrated in FIG. 2 can operate generally as follows. A user, such as user 33, works on a client, such as client system 32. User 33 requests access to resources on host system 48 across network 30. In response to this request, host system 48 attempts to authenticate user 33. In doing so, host system 48 requests a biometric attribute (i.e., biometric data) from biometric broker 44. Biometric broker 44 returns a biometric attribute or biometric template, which can be compared against sample biometric attribute(s) randomly collected from user 33. This comparison can take place at a number of locations, including at client system 32, at host system 48 or at biometric broker 44. If the sample biometric attribute collected from user 33 matches the biometric attribute retrieved from biometric broker 44, user 33 can be permitted to access resources on host system 48.

Providing a centralized authentication service such as biometric broker 114 has a number of advantages. One advantage is generally that centralized revocation can be supported. For example, an employee in an organization typically has access to a number of different resources on a number of different host systems. When this employee leaves the organization, it often takes a long time to explicitly revoke the employee's access rights on all host systems. Under a centralized revocation scheme, such revocation only needs to take place once at the centralized revocation service since the disparate host systems always look to the centralized revocation service to authenticate a user.

Figure 3:
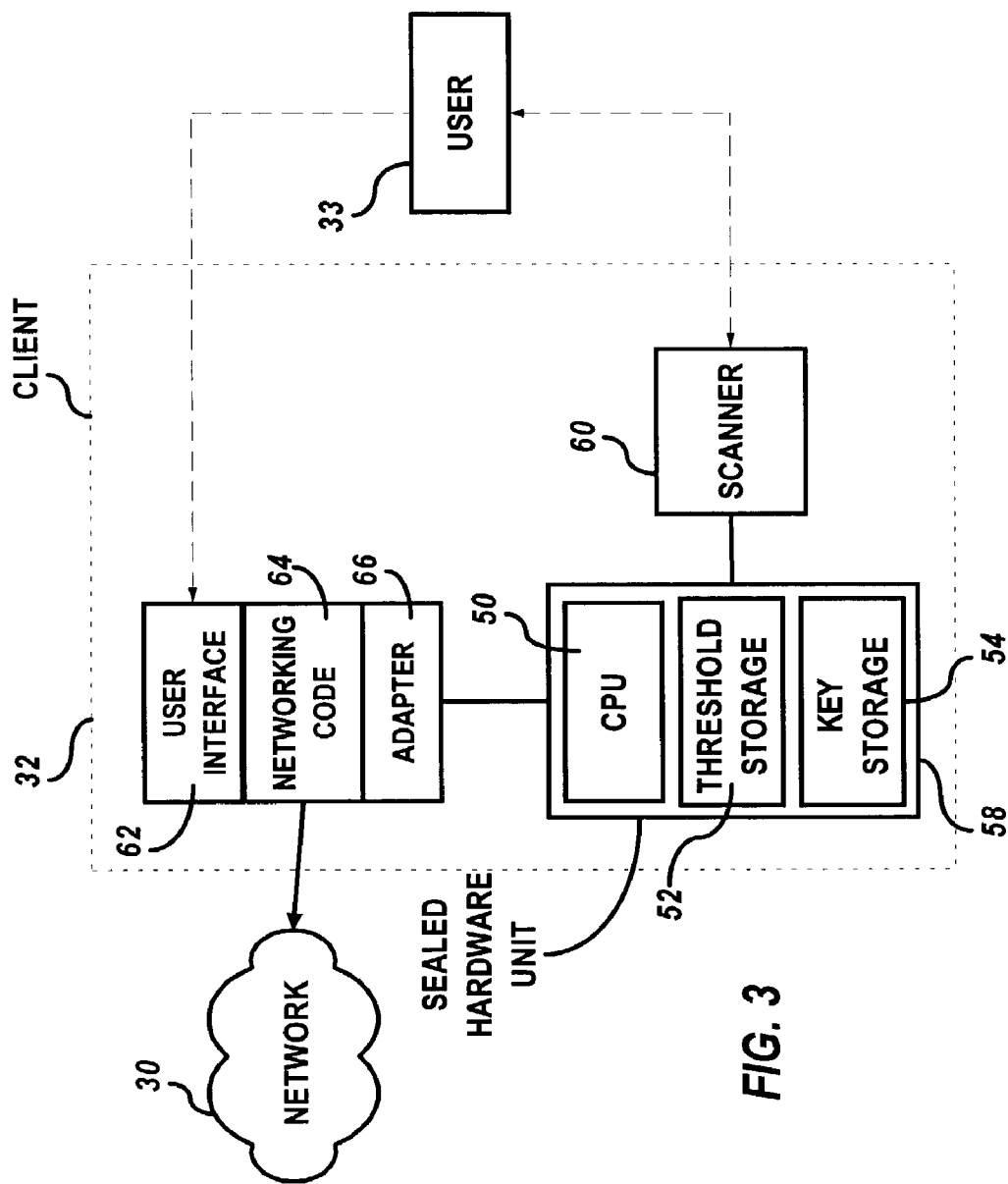
FIG. 3 illustrates a block diagram illustrating some of the functional components within the client computer system depicted in FIG. 2, which can be utilized to implement an embodiment of the present invention

FIG. 3 illustrates a block diagram illustrating some of the functional components within client computer system 32 that can be utilized to implement an embodiment of the present invention. Note that in FIGS. 2 and 3 identical parts are represented by identical reference numerals. As mentioned above, client system 32 can be any node on a computer network including computational capability and including a mechanism for communication across network 30. In the illustrated embodiment, client system 32 includes user interface 62, networking code 64 and adapter 66. These functional components can be implemented in software running on, for example, a client CPU. User interface 62 provides a mechanism through which user 33 can operate client system 32. Networking code 64 can include a library of functions, which allow client system 32 to communicate across network 30. Adapter 66 can include a collection of functions that implement the client portion of a biometric authentication system according to one embodiment of the present invention.

Adapter 66 can communicate with sealed hardware unit 58, which can be utilized to perform biometric authentication functions. In the example illustrated in FIG. 3, sealed hardware unit 58 can be encased in a sealed insulating layer, which prevents a malicious user of client system 32 from monitoring the computational operations performed within sealed hardware unit 58. This can prevent a malicious user from improperly gaining access to host system 48, even if the malicious user has the power to modify hardware and software resources on client system 32. The circuitry inside sealed hardware unit 58 can be encased in the insulating layer in such a manner that any attempt to cut through the insulating layer to monitor the circuitry is likely to render the circuitry inoperable. Of course, such features are presented herein for illustrative purposes only and should not be interpreted as limiting features of the present invention.

Sealed hardware unit 58 can include a CPU 50, which can be any type of computational engine that can be used to perform the computational and logical operations involved in biometric authentication. Sealed hardware unit 58 can additionally include threshold storage 52 and key storage 54. Threshold storage 52 can be utilized as a memory location for storing threshold values indicating how closely a biometric attribute take as a biometric sample from a user must match a biometric attribute retrieved from a database through biometric broker 44, in order to allow the user to access the host system. Key storage 54 can store at least one encryption key that can be used to encrypt messages or computer checksums for communications across network 30.

Sealed hardware unit 58 can communicate with scanner 60, which can be utilized to take a biometric sample (i.e., biometric attribute) from user 33. This biometric attribute can be any type of biometric measurement of user 33. This includes, but is not limited to, fingerprint data, retinal scan data, handwriting data, voice data (e.g., a voice print), and facial data (e.g., a face scan). Note that the biometric attributes stored as data within a database, such as biometric database 14 and/or user profile 15 of FIG. 1, can be stored as a template or "biometric template".

The components illustrated in FIG. 3 can operate as follows. User 33 initiates the biometric authentication process by seeking access to resources on a host system, such as host system 48 of FIG. 2, through user interface 62. This causes authentication code within adapter 66 to initiate communications with host system 48 (i.e., host system 48 illustrated in FIG. 2). This authentication code within adapter 66 can additionally initiate operations within sealed hardware unit 58 to gather a biometric attribute as a biometric sample from user 33 through scanner 60. These authentication operations are described in more detail below with reference to the flow charts in FIGS. 5 and 6.

FIG. 4 depicts a diagram illustrating biometric attributes and a user profile 82, which can be utilized in accordance with preferred embodiments of the present invention. Elements of user profile 82 in FIG. 4 can be analogous to user profile 15 of FIG. 1. Biometric attributes 80 can include fingerprints, voiceprints, retinal and iris information, hand geometry, facial information, and signatures. Thus, biometric authentication can be based on a variety of possible biometric measurements. A user profile 82 of a particular user will thus include one or more of the aforementioned biometric attributes. Such biometric attributes are utilized to verify the identity of the user.

Typical biometric measurements, which can be utilized to authenticate identity, include fingerprint verification. Fingerprint images contain a large amount of information and therefore has a reliable and inherent accuracy. Fingerprint identification is generally well known in the biometric arts and has been utilized since the 1800's by law enforcement agencies to assist law enforcement officers in criminal investigations.

Hand geometry can also be utilized to measure the physical characteristics of a user's hands and fingers. Hand geometry biometric authentication has traditionally been utilized for physical access control and time/attendance systems. Hand geometry has traditionally been limited to verification (i.e., one-to-one comparisons) rather than identification (one-to-many comparisons. Hand geometry systems do not measure or capture finger or palm prints, but can reliably measure the physical characteristics of an individual's hands from a three dimensional perspective.

Voice recognition is known as another important technique for identify users. In voice recognition systems, a voiceprint is obtained from a user and stored as biometric attributes for later user identification. It is generally well known in the biometric arts that an individual's voice contains unique wavelength sound characteristics. Such characteristics can be analyzed and stored as biometric data.

Retinal scanning is another biometric measurement technique that can be utilized in accordance with the present invention. Retinal scanning is generally based on a biometric measurement process that maps the structure of veins at the back of individual's eye. Retinal scanners typically send a beam of concentrated light into the eye. Retinal scanners, however, employ low intensity light for measuring the retina characteristics associated with an individual.

Iris scanning is another biometric measurement technique that can be utilized in accordance with the methods and systems disclosed herein. Iris scanning, well known in the biometric arts, scans unique random patterns of an individual's iris. Such a measurement method does not rely on the iris color. Iris scanning is generally based on the fact that the color portion of the eye that surrounds the pupil contains patterns that are unique to each individual. An individual's physical signature is another important biometric attribute that can be utilized to verify the identity of an individual. Signature verification can be readily utilized with the other biometric measuring techniques utilized above.

Facial recognition can be utilized in accordance with the present invention to enhance biometric authentication. In facial recognition techniques, a facial scan of an individual is taken and stored as data which can later be compared against a user's most recently provided facial scan to confirm or deny user identity. In typical facial scan systems, a user steps in front of a digital camera, which captures an image of the user's face. Associated software captures the image and creates a facial template.

Some facial recognition software currently in use relies on Local Feature Analysis (LFA) to measure the size and shape of features around the eyes or center of the face captured in the image, along with the width of the bridge of the nose or distance form the nose to each eye. Such software relies on features that are not statistically change altered to weight gain or loss, aging, facial hair growth and so forth.

An example of a facial recognition system that uses facial recognition software is Visionics'Faceit software, which works with simple digital Web cameras to verify a user's identity for access to computers and associated computer networks. Other biometric attributes are not shown in FIG. 4, but those skilled in the art can apply equally to the practice of the present invention. Such biometric attributes can include a palm print, ear shape, ear canal acoustic properties, DNA, keystroke (e.g., typing rhythm), and body odor.

Figure 5:
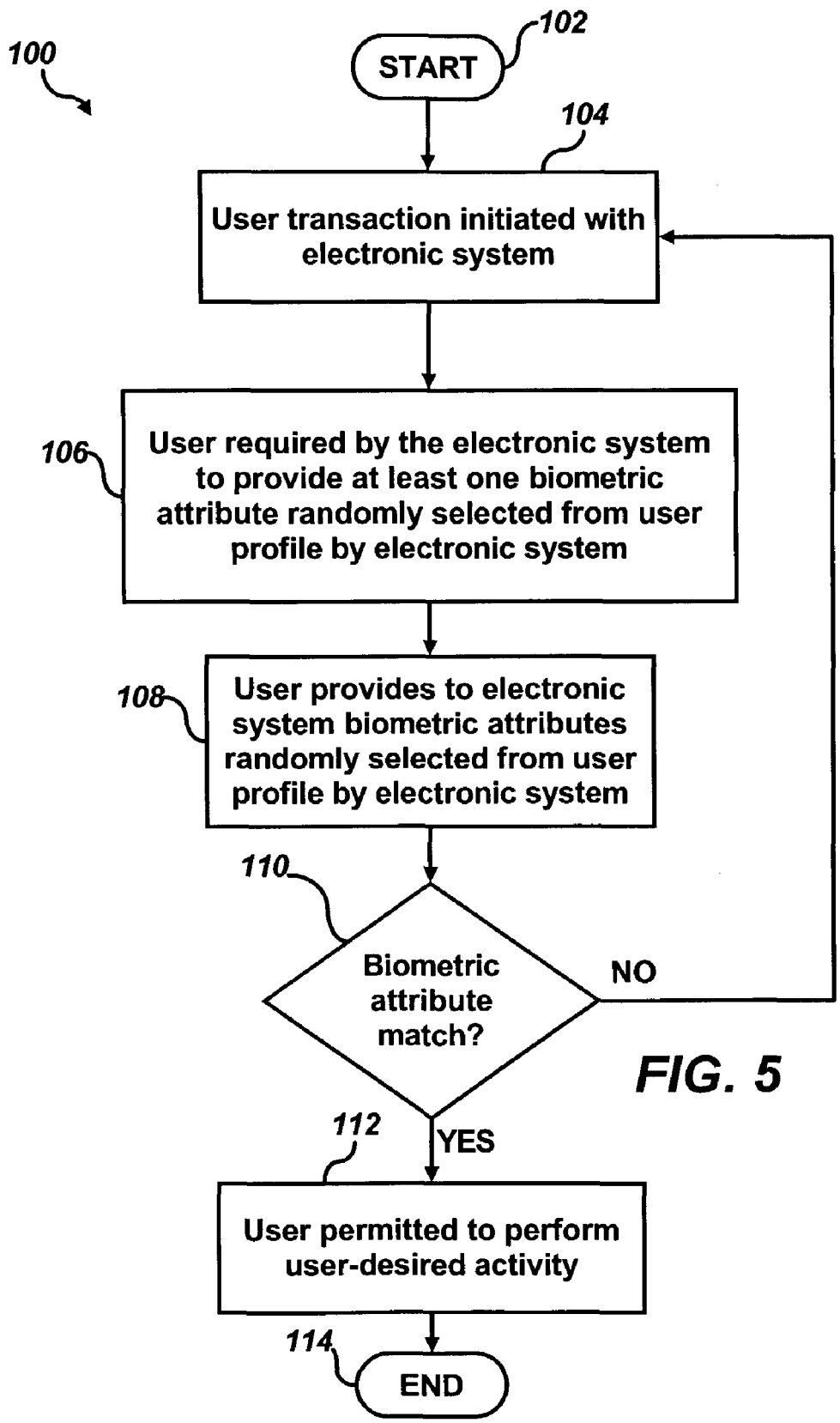
FIG. 5 illustrates a flow chart illustrating operations for authenticating a user in accordance with an embodiment of the present invention.

FIG. 5 illustrates a flow chart 100 illustrating operations for authenticating a user, in accordance with an embodiment of the present invention. The process can be initiated as indicated at block 102. A user transaction can be initiated with an electronic system, as depicted thereafter at block 104. Such an electronic system can, for example, be configured as an ATM and/or point of sale linked to a computer network that communicates with a biometric broker, such as biometric broker 44 of FIG. 2.

As explained previously, such a biometric broker can be composed of a database containing biometric attributes and/ or a user profile integrated with or in communication with the database. The user profile contains previously store biometric attributes of a particular user. A user during enrollment can provide biometric attributes. During such an enrollment stage, samples of designated biometric attributes can be acquired. One or more unique features of the samples can then be configured to form a biometric template of one or more biometric attributes for subsequent comparison purposes.

As depicted next at block 106, the user is requested by the electronic system to provide at least one biometric attribute. The operation described at block 106 is based on random factors. In the operation depicted at block 106, the user is prompted to input to the electronic system at least one biometric attribute randomly selected from a user profile containing biometric attributes of the user. User input of a biometric attribute can be based on this random selection. Thereafter, as illustrated at block 108, the user provides to the electronic system, the biometric attributes randomly selected by the electronic system from the user profile.

As described next at block 110, a comparison can be made between the random biometric attribute(s) selected by the electronic system from the user profile and the biometric attributes input by the user to a biometric scanner. If a match does not occur, then the process can be repeated, for example, beginning with the operation depicted at block 104. Alternatively, the process can begin, as indicated at block 106 where the user session has not been terminated.

If a match does occur, then as depicted at block 112, the user can be permitted to perform a user-desired activity such as, for example, performing financial transactions. If a biometric attribute input by the user to the electronic system does not match one or more of the biometric attributes randomly selected from the user profile associated with the user after, for example, three attempts, the user is not permitted to perform user-desired activities or transactions.

Figure 6:
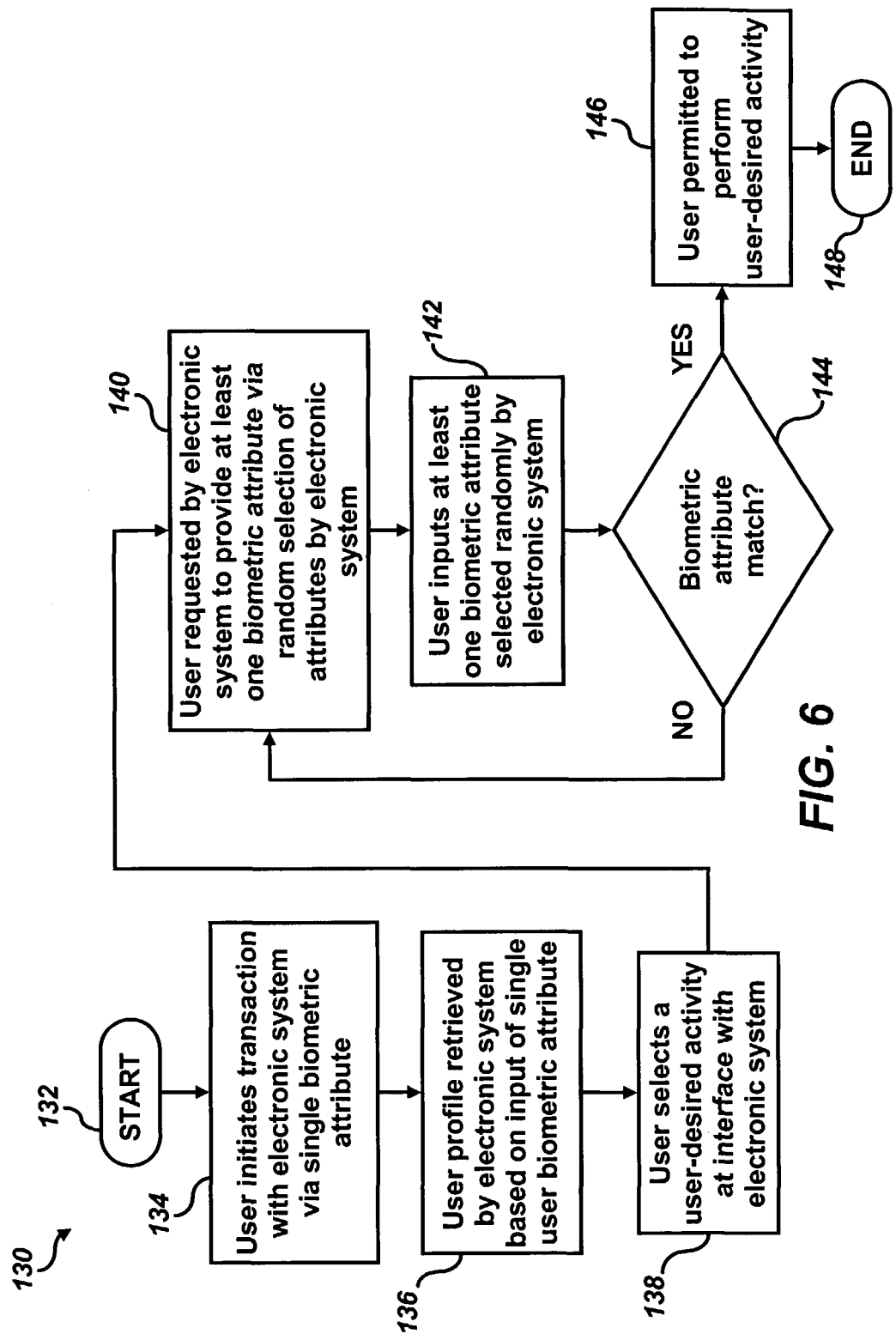
FIG. 6 depicts a flow chart illustrating additional operations for authenticating a user in accordance with an embodiment of the present invention.

FIG. 6 depicts a flow chart 130 illustrating additional operations for authenticating a user, in accordance with another embodiment of the present invention. The process can be initiated, as indicated at block 132. Thereafter, as illustrated at block 134, a user can initiate a transaction with an electronic system via submission of a single biometric attribute. This single biometric attribute can be provided via, for example, a fingerprint provided by the user through a fingerprint scanner integrated with the electronic system.

This single biometric attribute can also be provided via a smart card that is receivable by, or in association with, the biometric system. Biometric attributes can be previously stored within a memory location contained within the smart card for later retrieved (e.g., read or scanned by an electronic system at a point of sale or ATM) for user authentication or verification purposes using biometric methods taught herein. Smart cards are generally known in the art to appear as credit card sized plastic cards with an embedded computer chip. The chip can either be a microprocessor with internal memory or a memory chip with non-programmable logic. The chip connection can be configured via direct physical contact or remotely through a contactless electromagnetic interface.

Smart cards can be generally configured as either a contact or contactless smart card, or a combination thereof. A contact smart card requires insertion into a smart card reader with a direct connection to, for example, a conductive micromodule on the surface of the card. Such a micromodule can be generally gold plated. Transmission of commands, data, and card status takes place through such physical contact points.

A contactless card requires only close proximity to a reader. Both the reader and the card can be implemented with antenna means providing a contactless link that permits the devices to communicate with one another. Contactless cards can also maintain internal chip power or an electromagnetic signal, such as RF tagging technology, which is discussed in more detail herein with respect to FIGS. 19 and 20. Two additional categories of smart codes, well known in the art, which are based on contact and contactless cards are the so-called Combi cards and Hybrid cards.

A Hybrid card generally can be equipped with two chips, each with a respective contact and contactless interface. The two chips are not connected, but for many applications, this Hybrid serves the needs of consumers and card issuers. The Combi card can be generally based on a single chip and can be generally configured with both a contact and contactless interface.

Chips utilized in such smart cards are generally based on microprocessor chips or memory chips. Smart cards based on memory chips depend on the security of the card reader for their processing and can be utilized when low to medium security requirements. A microprocessor chip can add, delete and otherwise manipulate information in its memory. Microprocessor-based memory cards typically contain microprocessor chips with 8, 16, and 32 bit architectures.

When a transaction is initiated with a biometric attribute, the user can input a single biometric attribute at the request of, or to initiate, the electronic system. The electronic system can be, for example, an ATM machine equipped with a biometric scanner. The biometric scanner can be configured with, for example, iris scanning, retinal scanning, and fingerprint scanning capabilities. The user can, for example, provide his or her left thumbprint, if requested by the electronic system, to initiate a transaction utilizing the electronic system. Following user input of a single biometric attribute, a user profile can be retrieved by the electronic system based on the input of a single user biometric attribute, such as a fingerprint. Again, retrieval can be from a server, electronic system memory, or portable device memory (e.g., smart card or other electronic hand held device)

The user selects a desired user-activity at an interface associated with the electronic system, as indicated at block 138, and thereafter, as illustrated at block 140, the user can be requested by the electronic system to provide at least one biometric attribute via random selection of such an attribute by the electronic system from the user's template/profile. Biometric attributes are thus randomly selected from the user profile associated with the user. The user must then provide the electronic system with biometric attributes that match the biometric attributes randomly selected from the user profile, as indicated at block 142.

If a biometric attribute input by the user through an interface and biometric scanner associated with the electronic system does not match the biometric attributes randomly selected from the user profile, the user can be requested again, as indicated at block 140. If, however, a match is made, then the user can be permitted to perform the user-desired activity, such as accessing secure data or entry to a secure building, as illustrated at block 146. The process then terminates, as indicate at block 148.

Figure 7:
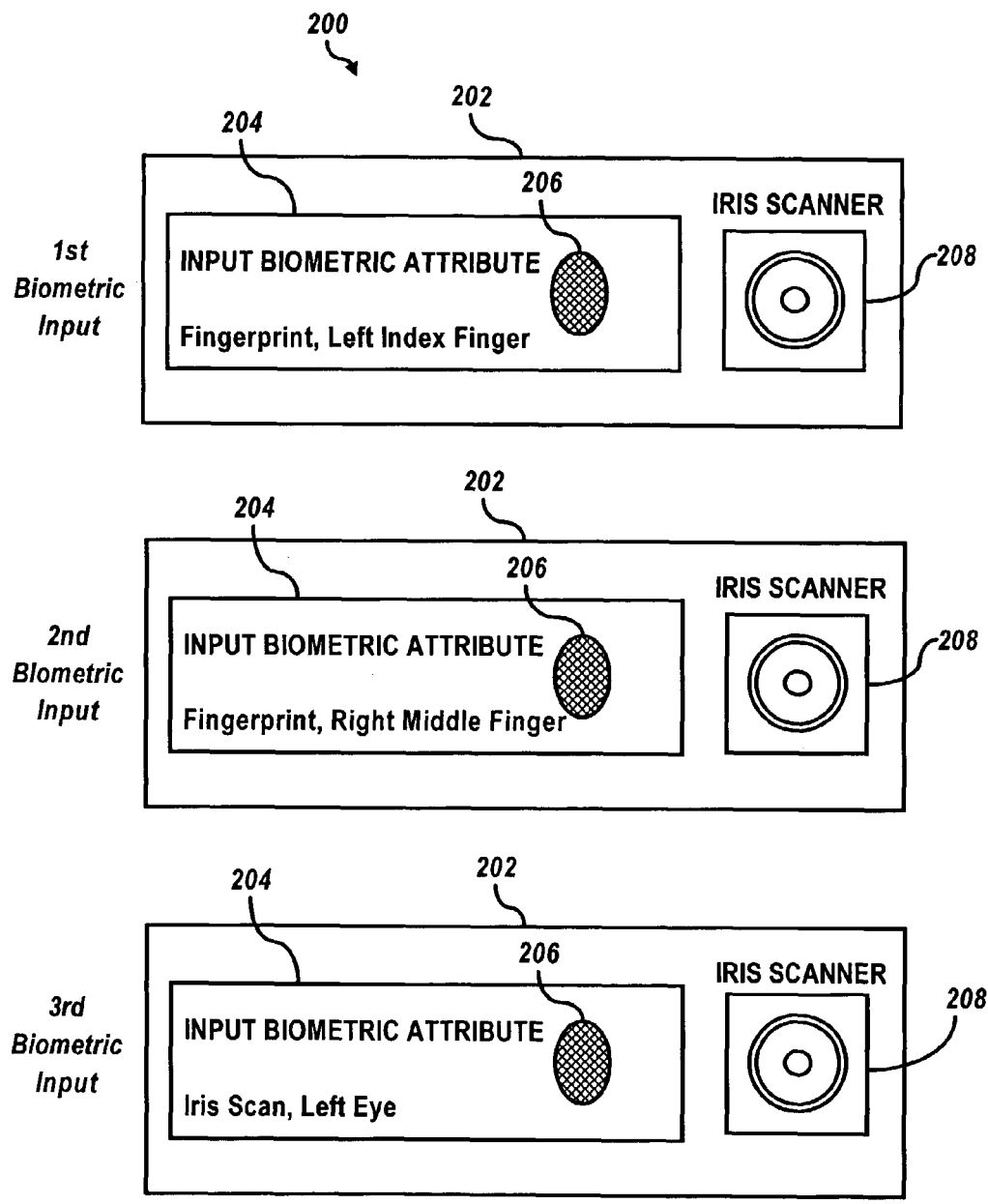
FIG. 7 illustrates a system that includes a portion of a user interface that can be implemented in accordance an alternative embodiment of the present invention.

FIG. 7 depicts a system 200, which can include a user interface 202 that can be implemented in accordance with the present invention. In the drawing illustrated in FIG. 7, user interface 202 is shown, for example, at three different moments in time. User interface 202 can be analogous to user interface 64 of FIG. 3. Those skilled in the art can appreciate that a user interface 202 can be of many forms depending on the type of biometric sample being requested, obtained and/or utilized. It can be appreciated by those skilled in the art that user interface 202 can be implemented in the context of a hardware unit which communicates with one or more electronic systems (e.g., a building security systems, PDA, laptop computer, computer network, wireless communications network, etc.).

As indicated previously, a user can be requested by an electronic system to provide one or more biometric samples for authentication purposes. Biometric samples can be of different types described herein (e.g., voice, fingerprint, eye, etc.). The user can be prompted to input biometric samples randomly selected by the electronic system from a user profile containing biometric attributes previously obtained from the user. User interface 202 can be integrated with, for example, an ATM machine, or a secure door that accesses a secure area, such as a government building or military complex. In the example depicted in FIG. 7, user interface 202 includes an iris scanner 208 and a fingerprint scanner 206. Finger print scanner 206 can be integrated with a display area 204, which can also be integrated with iris scanner 208.

Input of a biometric attribute by a user to interface 202 can be based on the random selection of a biometric attribute from a user profile. The number of biometric attributes requested from a user can also be based on a random number. For example, during one authentication session, a user can be requested to provide a left index fingerprint and a left iris scan. During another authentication session, the same user can be required to provide a left index fingerprint, followed by the fingerprint of his or her right middle finger, and immediately thereafter, an iris scan of a left eye, or perhaps, a right eye.

The selection of biometric attributes from the user profile can thus be based on a random selection. The number of required biometric samples that a user can be required to input can also be a random number. Those skilled in the art will appreciate, however, that the number of biometric attributes required to be input by a user will likely be a limited number. Thus, a user can be required to input only three biometric attributes during one authentication session, two biometric attributes during another authentication session, and five biometric attributes during another biometric session.

Those skilled in the art can also appreciate that other biometric scanning devices can also be integrated with the user interface 202, such as, for example, a retina scanner, palm scanner, voice print scanner, and so forth. Thus, the example illustrated in FIG. 7 should not be interpreted as limiting the invention. The drawing illustrated in FIG. 7 merely represents one possible embodiment in which the present invention can be implemented.

Figure 8:
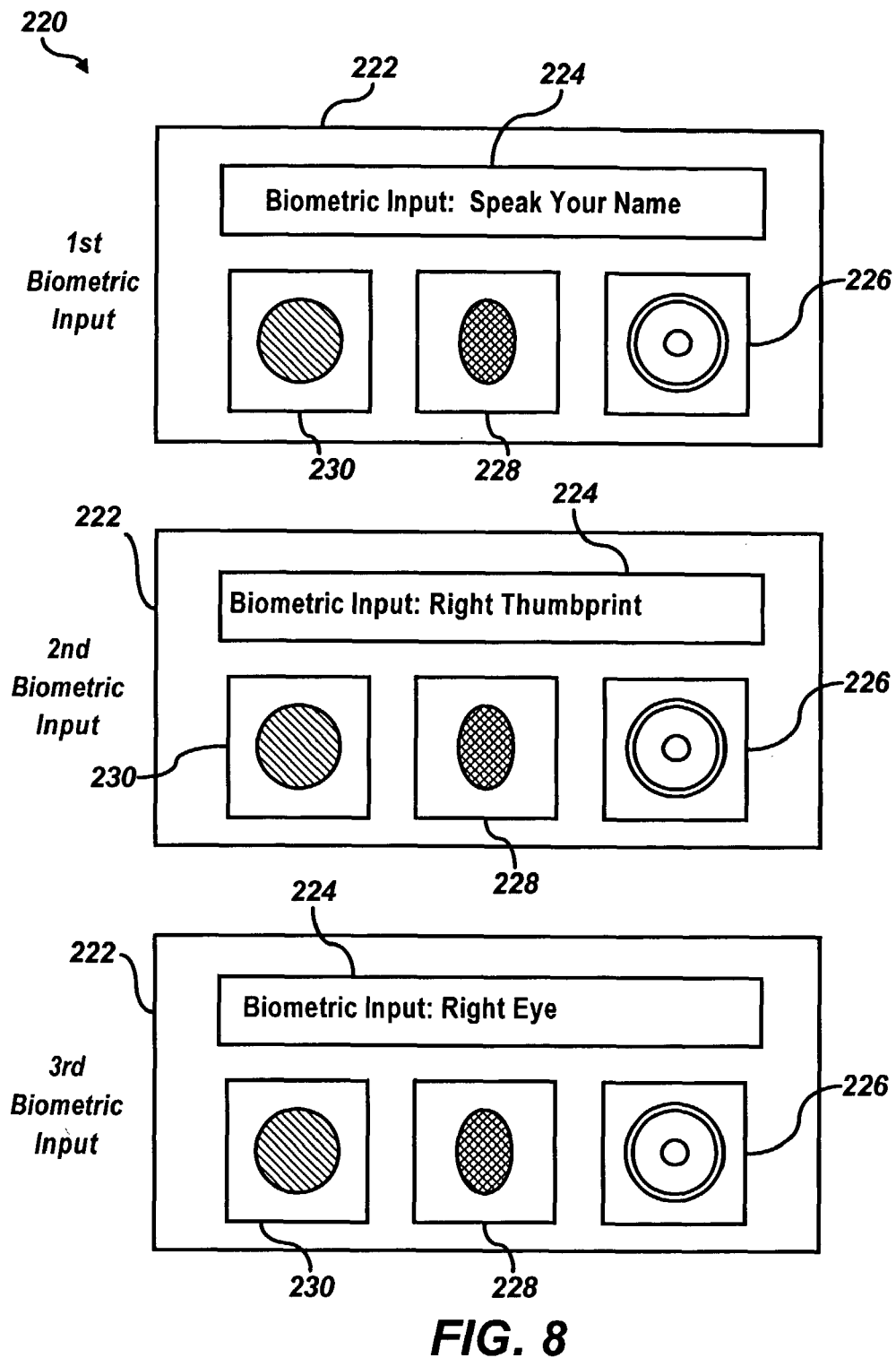
FIG. 8 depicts a system that includes a portion of an alternative user interface that can be implemented in accordance with an alternative embodiment the present invention.

FIG. 8 depicts a system 220 that can include an alternative user interface 222 that can be implemented in accordance with the present invention. User interface 222 can communicate with or be integrated with an electronic system, such as an ATM machine or point of sale. User interface 222 can be integrated with a microphone 230 that can receive a voiceprint from a user. User interface 222 can also be integrated with a fingerprint scanner 228 that captures fingerprints as biometric data from users. Additionally, user interface 222 can include a camera 226 that functions for iris, retinal, and facial scanning purposes.

Note that system 220 generally illustrates first, second and third biometric attribute input stages. During a first biometric attribute input stage, a user can be prompted through a display unit 231 to input his or her name or other word or phrase (or other information). The user merely speaks his or her name, for example, into microphone 230. During a second biometric attribute input stage, the user can be requested to input his or right hand thumbprint. Finally, during a third biometric attribute input stage, the user can be requested to provide a biometric sample of his or right eye, which can be scanned as a retina or iris biometric attribute of the user. Alternatively, the user can be asked to provide a facial scan, in which case, camera 226 captures a facial image of the user for biometric authentication purposes.

Figure 9:
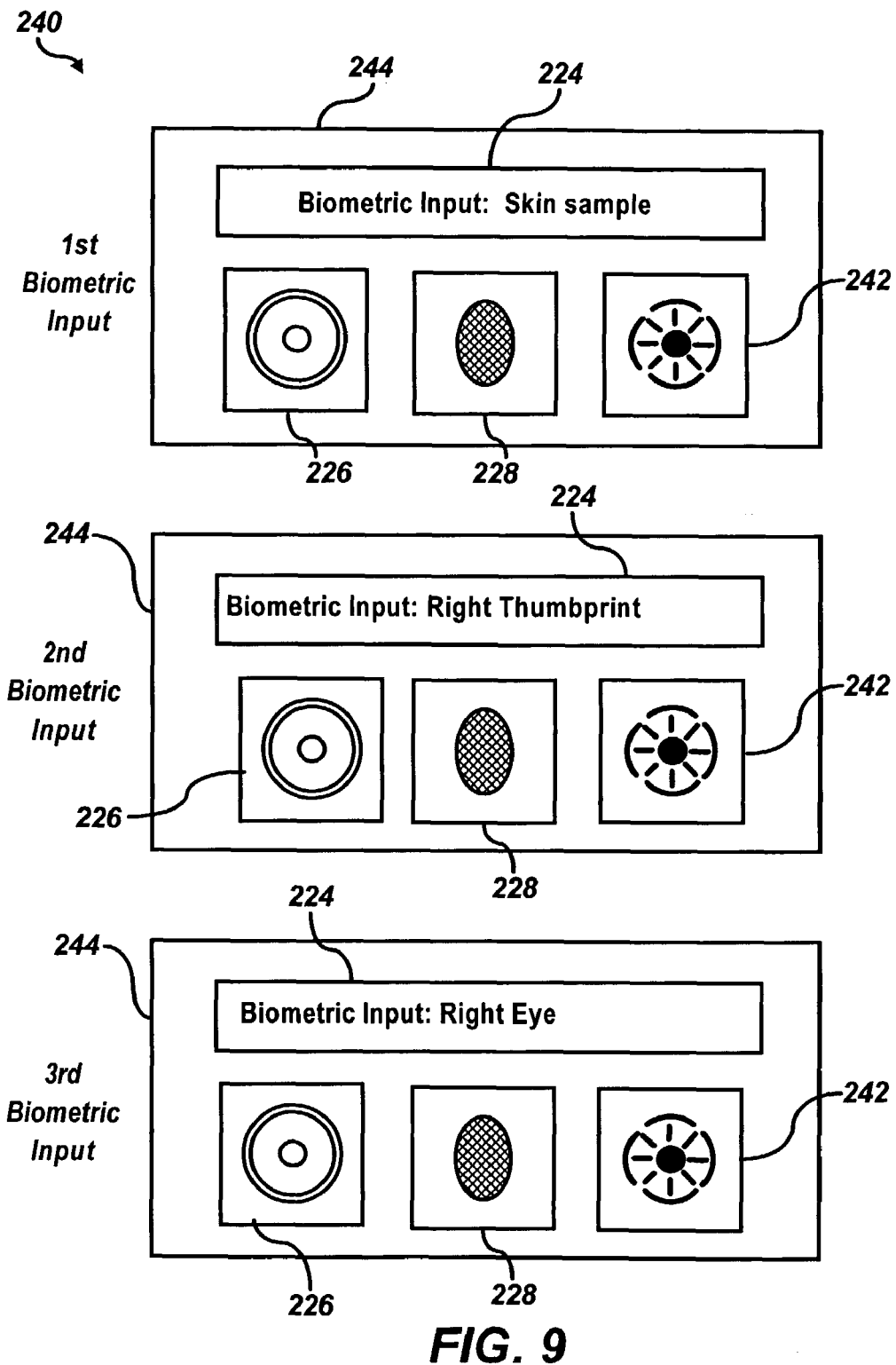
FIG. 9 depicts illustrates a system that includes a portion of an alternative user interface that can be implemented in accordance with an alternative embodiment of the present invention.

FIG. 9 illustrates depicts a biometric authentication system 240, which includes an alternative user interface 244 that can be implemented in accordance with an alternative embodiment of the present invention. Note that in FIGS. 8 and 9, similar, analogous or identical parts or features are indicated by identical reference numerals. Thus, as indicated in FIG. 9, user interface 244 can communicate with or be integrated with an electronic system, such as an ATM machine or point of sale. System 240 can include user interface 244 in the context of a standalone hardware unit or in association with an electronic system, such as an ATM machine, point of sale, computer network, wireless network, stand-alone laptop computer, etc. User interface 244 can be associated with and/or integrated with a fingerprint scanner 228 that captures fingerprints as biometric data from users. Additionally, user interface 244 can include a camera 226 that functions for iris, retinal, and facial scanning purposes. User interface 244 can also be associated with and/or integrated with a skin sensor 242, which senses the unique optical properties of the skin of an individual user.

FIG. 9 illustrates first, second and third biometric attribute input stages. During a first biometric attribute input stage, a user can be prompted through a display unit 231 to input a skin sample. Skin sensor 242 performs a measurement and/or analysis of a skin sample, which identifies the user. During a second biometric attribute input stage, the user can be requested to input his or right hand thumbprint. Finally, during a third biometric attribute input stage, the user can be requested to provide a biometric sample of his or right eye, which can be scanned as a retina or iris biometric attribute of the user. Alternatively, the user can be asked to provide a facial scan, in which case, camera 226 captures a facial image of the user for biometric authentication purposes.

A variety of types of skin sensors can be utilized for sensing the biometric properties of an individual's skin. One example of a skin sensor that can be utilized in accordance with an alternative embodiment of the present invention is disclosed in U.S. Patent Application No. 2002/0183624A1, "Apparatus and Method of Biometric Determination Using Specialized Optical Spectroscopy Systems," which published on Dec. 5, 2002, and which is incorporated herein by reference.

U.S. Patent Application No. 2002/0183624A1 generally discloses devices and methods for performing biometric determinations using optical spectroscopy of tissue. Such biometric determinations can include the determination or verifications of identity, estimation of age, estimation of sex, determination of sample liveness and sample authenticity. Such devices are based upon discrete light sources such as light emitting diodes, laser diodes, vertical cavity surface emitting lasers (VCSELs), and broadband sources with multiple narrow-band optical filters. The multiple light sources can be encoded in a manner that the tissue response for each source can be efficiently measured. The light sources are spaced at multiple distances from a detector to contribute differing information to the biometric determination task as do light sources with different wavelength characteristics.

U.S. Patent Application No. 2002/0183624A1 also discloses devices that incorporate a spectral biometric sensor with a personal electronic device such as cellular telephones, personal digital assistants, wristwatches, electronic fobs for the purpose of providing secure biometric access to protected property. It can be appreciated by those skilled in the art that U.S. Patent Application No. 2002/0183624A1 is not considered a limiting feature of the present invention, but is instead referenced herein for general illustrative and edification purposes only.

Figure 10:
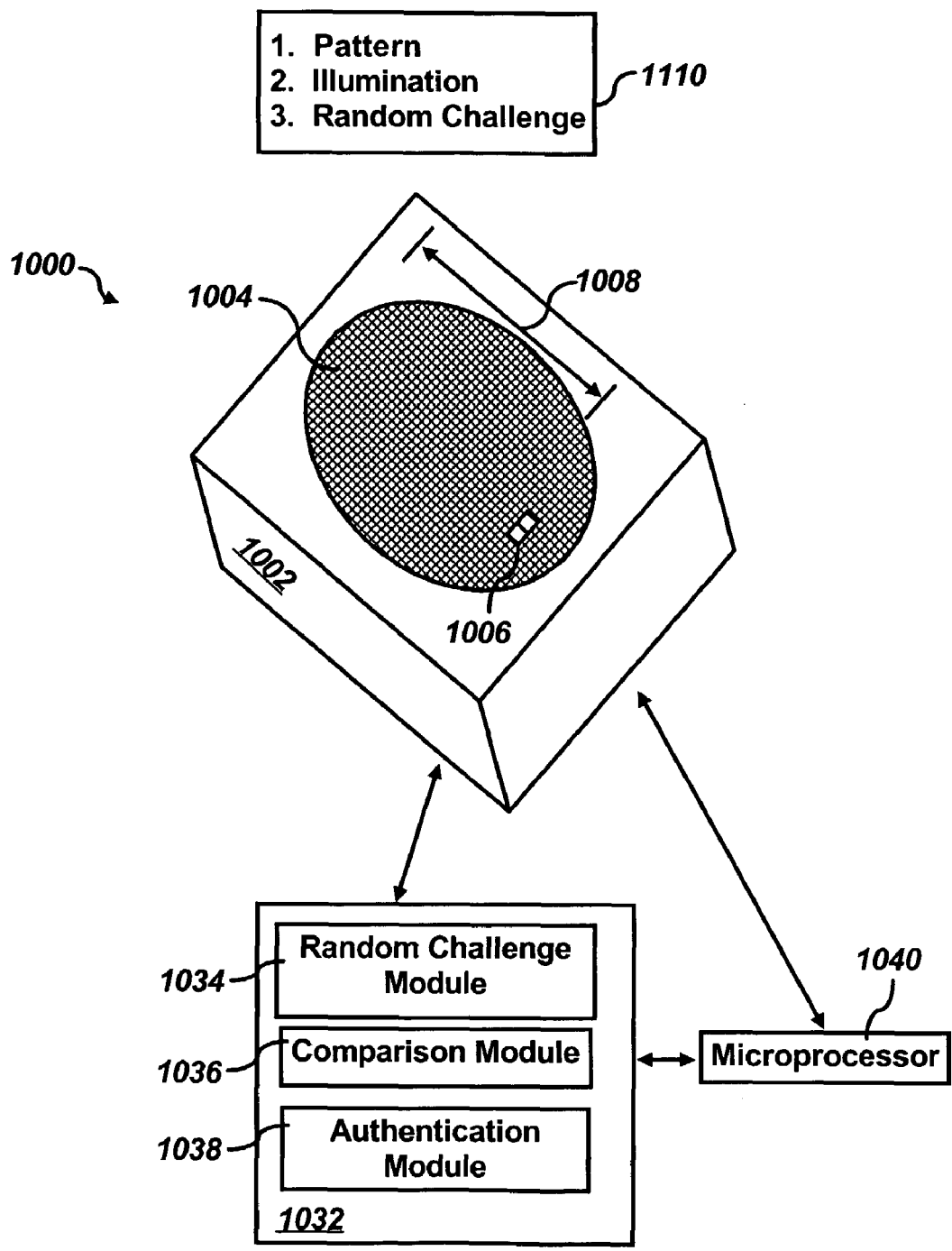
FIG. 10 illustrates a pictorial representation of a biometric authentication system, which can be implemented in accordance with an alternative embodiment of the present invention.

FIG. 10 illustrates a pictorial representation of a biometric authentication system 1000, which can be implemented in accordance with an alternative embodiment of the present invention. Biometric authentication system 1000 includes a biometric authentication unit 1002, which can be utilized to biometrically authenticate a user based on an individual's fingerprints and/or a skin analysis. A fingerprint scanner 1004 can be associated with and/or integrated with a skin sensor 1006. Skin sensor 1006 can be, for example, a type of skin sensor as disclosed in U.S. Patent Application No. 2002/0183624A1. Skin sensor 1006 can thus be generally configured as system or device for collecting spectral information from tissue for performing biometric tasks Such a system or device can include a plurality of discrete light sources, means for directing light into the tissue, means for detecting light that substantially passed through sub-surface tissue, a means for recording and storing resulting detector signals, and a means for processing resulting spectral data to perform a biometric determination.

A user places his or her fingertip at fingerprint scanner 1004. A fingerprint can then be sensed either alone or in concert with skin sensor 1006 (i.e., a skin detection apparatus), which detects skin properties for biometric authentication thereof. Fingerprint scanner 1004 can be optionally configured such that the entire fingerprint of an individual scan or only a portion, as indicated by arrow 1008, in concert with skin sensor 1006. System 1000 generally comprises three features as indicated at block 1110, including pattern recognition (i.e., fingerprint scanning), and/or skin sensing (i.e., illumination/detection of skin) and/or in concert with a random challenge, which is discussed in detail herein. Skin sensor 1006 is generally analogous to skin sensor 242 of FIG. 9, but can be configured with different features, which are illustrated in more detail in FIGS. 11 to 13 herein.

FIG. 10 thus generally illustrates system 1000 for the random biometric authentication of a user utilizing unique biometric attributes associated with the user. System 1000 can additionally be configured to include a plurality of modules 1032. Such modules can be configured as software modules, as described in further detail herein. Modules 1032 can include a random challenge module 1034 for challenging a user to provide at least one randomly selected biometric attribute, a comparison module 1036 for automatically comparing the at least one randomly selected biometric attribute to a plurality of biometric attributes of the user contained in a user profile; and an authentication module 1038 for authenticating the user in association with skin sensor 1006 for analyzing the issue of the user for one or more tissue biometric attributes associated with the user.

Authentication module 1038 can authenticate the user of one or more randomly selected biometric attributes input by the user matches at least one of the plurality of biometric attributes of the user contained in the user profile and if the tissue biometric attribute of the user matches at least one tissue biometric attribute of the user contained in the user profile. Modules 1032 are processible via a microprocessor 1040, which can be associated with and/or integrated with biometric authentication unit 1002. Additionally, such modules 1032 can be stored within a memory location (not shown), which can also be associated with and/or integrated with biometric authentication unit 1002.

Figure 11:
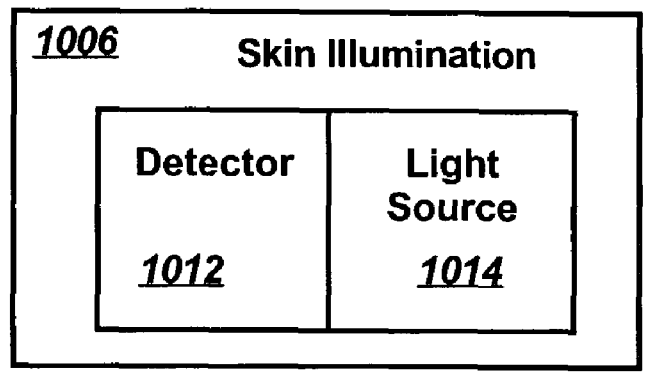
FIG. 11 depicts a block diagram illustrating a skin detection apparatus, which can be utilized in accordance with an alternative embodiment of the present invention.
Figure 12:
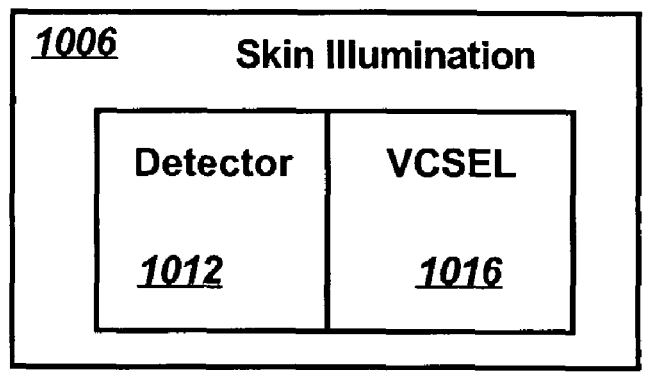
FIG. 12 illustrates a block diagram illustrating a skin detection apparatus, which can be utilized in accordance with an alternative embodiment of the present invention.

FIG. 11 depicts a block diagram illustrating a skin detection apparatus, which can be utilized in accordance with an alternative embodiment of the present invention. Skin sensor 1006 indicated in FIG. 11 can be composed of two portions, a detector 1012 and a light source 1014. Light from light source 1014 is transmitted to a portion of an individual's skin, which is illuminated thereof for detection and analysis (e.g., spectroscopy) by detector 1012. Note that in FIGS. 10 to 14 herein like or analogous parts are indicated by identical reference numerals. Thus, FIG. 12 illustrates a block diagram illustrating a skin detection apparatus, which can be utilized in accordance with an alternative embodiment of the present invention.

Figure 13:
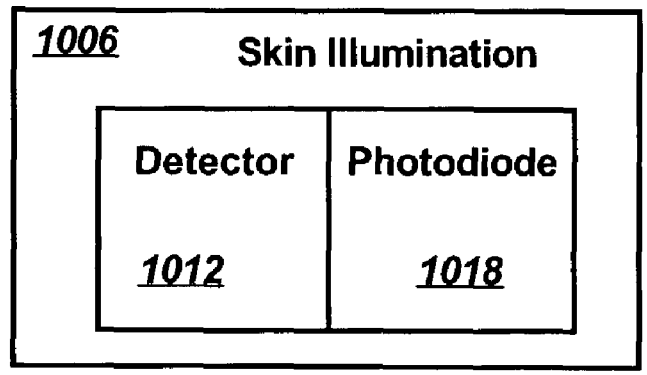
FIG. 13 depicts a block diagram illustrating a skin detection apparatus, which can be utilized in accordance with an alternative embodiment of the present invention.

Additionally, FIG. 13 depicts a block diagram illustrating a skin detection apparatus, which can be utilized in accordance with an alternative embodiment of the present invention. In FIG. 12, a VCSEL 1016 can be utilized as a light source, while in FIG. 13, a photodiode can be utilized as a light source. It can be appreciated that other types of light sources (e.g., a laser light source) can also be implemented in accordance with alternative embodiments of the present invention.

Figure 14:
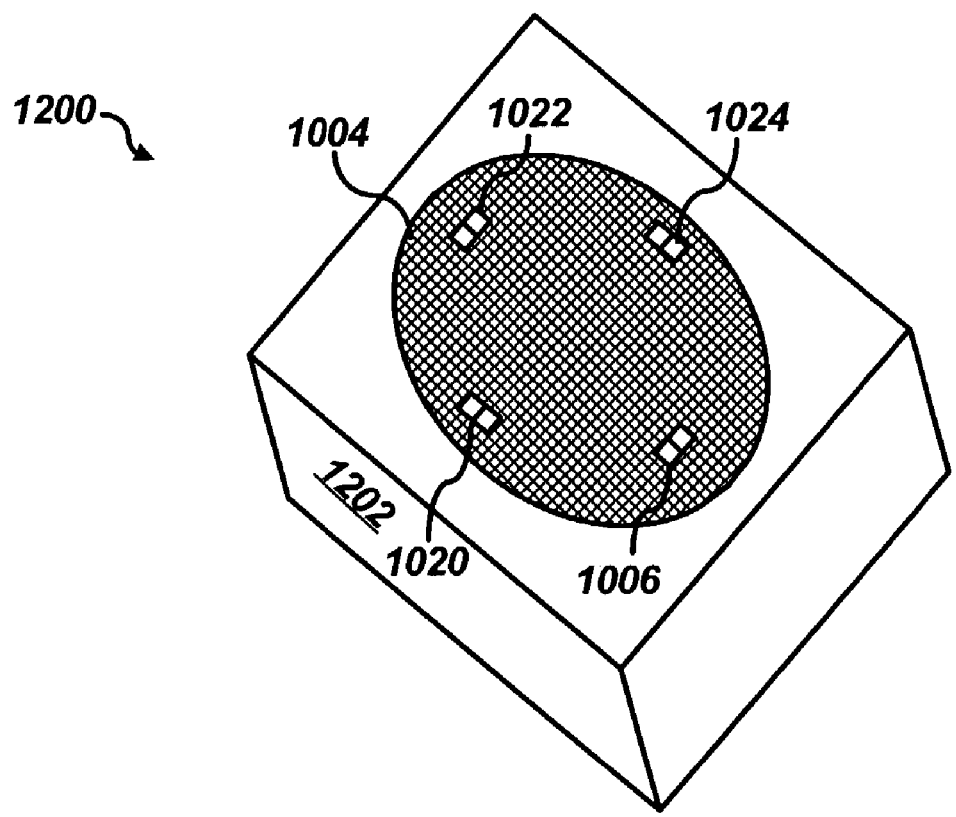
FIG. 14 illustrates a pictorial diagram of a biometric authentication system, which can be implemented in accordance with an alternative embodiment of the present invention.

FIG. 14 illustrates a pictorial representation of a biometric authentication system 1200, which can be implemented in accordance with an alternative embodiment of the present invention. The biometric authentication system 1200 of FIG. 14 is generally analogous to the biometric authentication system 1000 depicted in FIG. 10, the difference being that additional sensors 1020, 1022 and 1024 can also be utilized in association with fingerprint scanner 1004 and skin sensor 1006. Sensors 1020, 1022 and 1023 can be the same type of sensor as skin sensors 1006, or one or more of these additional sensors can be used to obtain a biomedical attribute in accordance with an alternate embodiment of the present invention.

Where all four sensors 1006, 1020, 1022 and 1023 are skin sensors, the interface allows a biometric system to obtain distributed illumination sample over a broader area of a user's finder. More than one sample enables a system to obtain better results through redundancy. The results of several sensors can processed by a system by averaging plural samples, or by using different wavelengths of light to test the skin. A processor associated with the sensor can determine authentication using a broader range of criteria using more than one sensor, especially when combined with a fingerprint scanner 1004.

Where any of sensors 1020, 1022 and 1023 are biomedical sensors, the system can be provided with biomedical data from the specimen (e.g., user's finger), such as pulse and heart rate. Obtaining pulse and heart rate reading can be useful to verify whether the specimen being read is alive. Although the prior art uses data obtained from photo-illumination of the skin to determine if the skin is associated with a live person, it should be appreciated that a specimen, such as an amputated finger, may not show signs that can be associated with death until several minutes, which leaves enough time for an unauthorized user to gain access to an electronic system using prior art fingerprint scanners. When a specimen, however, is tested for biomedical readings, such as pulse with a sensor that is associated with the fingerprint reader, the system can determine whether the specimen is associated with a live person. Given the foregoing teaching, one skilled in the art can appreciate that sensors 1006, 1020, 1022 and 1023 can be deployed on fingerprint scanner 1006 as a combination of skin illumination and biomedical sensors.

It should also be appreciated based on the present teaching that a system, similar to that illustrated in FIG. 10 with a skin sensor 1006, could also be provided that incorporates a biomedical sensor together with a fingerprint scanner as a single interface. Finally, with respect to the present alternate teaching and embodiment, when interpreted in light of illustrations in FIGS. 10 and 14, it should be appreciated that a hardware interface as described can be useful for carrying out simple biometric authentication methods where the user is not challenged or required to provide random biometrics. A device that is physically layered with at least two different types of biometric input sensors/readers would be generally useful in the field of biometrics. The present teaching can also be implemented, although not shown, in an interface that combines at least two biometric measurement layered into a single interface, such as: hand geometry, fingerprint, biomedical, skin illumination.

Those skilled in the art will appreciate that the methods described herein can be implemented in the context of associated systems for performing tasks resulting from the processing of such methods. The present invention can thus be configured as a system for biometrically securing access to an electronic system. Such a system can include modules thereof. A module, in software use, is generally a collection of routines and data structures that performs a particular task or implements a particular abstract data type. Module typically are composed of an interface, which lists the constants, data types variables, and routines that can be accessed by other modules or routines, and an implementation, which can be accessible only by the module. The implementation contains the source code that actually implements the routines in the module.

Thus, the system described herein can include a module for prompting a user to input to the electronic system at least one biometric attribute randomly selected from a user profile containing biometric attributes of the user. Additionally, the system can include a module for permitting the user to perform a user-desired activity if at least one biometric attribute input by the user to the electronic system matches the at least one biometric attribute randomly selected from the user profile. Of course, hardware described herein can be used without regard to random challenges as discussed previously.

With respect to the embodiment of the present biometric system, the user profile can be accessed from a server and/or memory through the electronic system. The user profile can also be accessible from a biometric broker through the electronic system over a secure network connection. Additionally, at least one biometric attribute can be obtained from the user for compilation in a user profile. The user profile is generally stored in a location accessible by at least one electronic system. The user can generally be permitted to modify the user profile, in response to approval by the system or an administrator.

Such a system can also include a module for comparing at least one biometric attribute input by the user to the electronic system with the at least one biometric attribute randomly selected from the user profile. Additionally, such a system can include a module for subsequently prompting a user to input to the electronic system at least one additional biometric attribute randomly selected from the user profile, if at least one biometric attribute previously input by the user to the electronic system does not match the at least one biometric attribute randomly previously selected from the user profile.

In such a system, the electronic system can be configured as one or more wireless devices that operate with a wireless network. The electronic system can also be configured as one or more computer workstations operable over an associated network. The electronic system can include an automated teller machine, or a secured entry system to a secured environment. The electronic system can simply be a wireless network or a computer network, or a combination thereof. The electronic system can also be a wireless device.

Such a system can also include a module for identifying at least one defective biometric attribute associated with the user. The user can be prompted to input to the electronic system at least one additional biometric attribute randomly selected from a user profile containing biometric attributes of the user. The user-desired activity can comprise activities, such as, for example, a financial transaction, an ATM transaction, access to a secure area, or access to data from the electronic system. The user-desired activity can also simply comprise the execution of a mechanical activity.

Alternatively, a system for biometrically securing access to an electronic system can include a module for prompting a user to input to the electronic system at least two biometric attributes randomly selected from a user profile containing biometric attributes of the user. Such an alternative system can also include a module for permitting the user to perform a user-desired activity, if biometric attributes input by the user to the electronic system matches the at least two biometric attribute randomly selected from the user profile.

Figure 15:
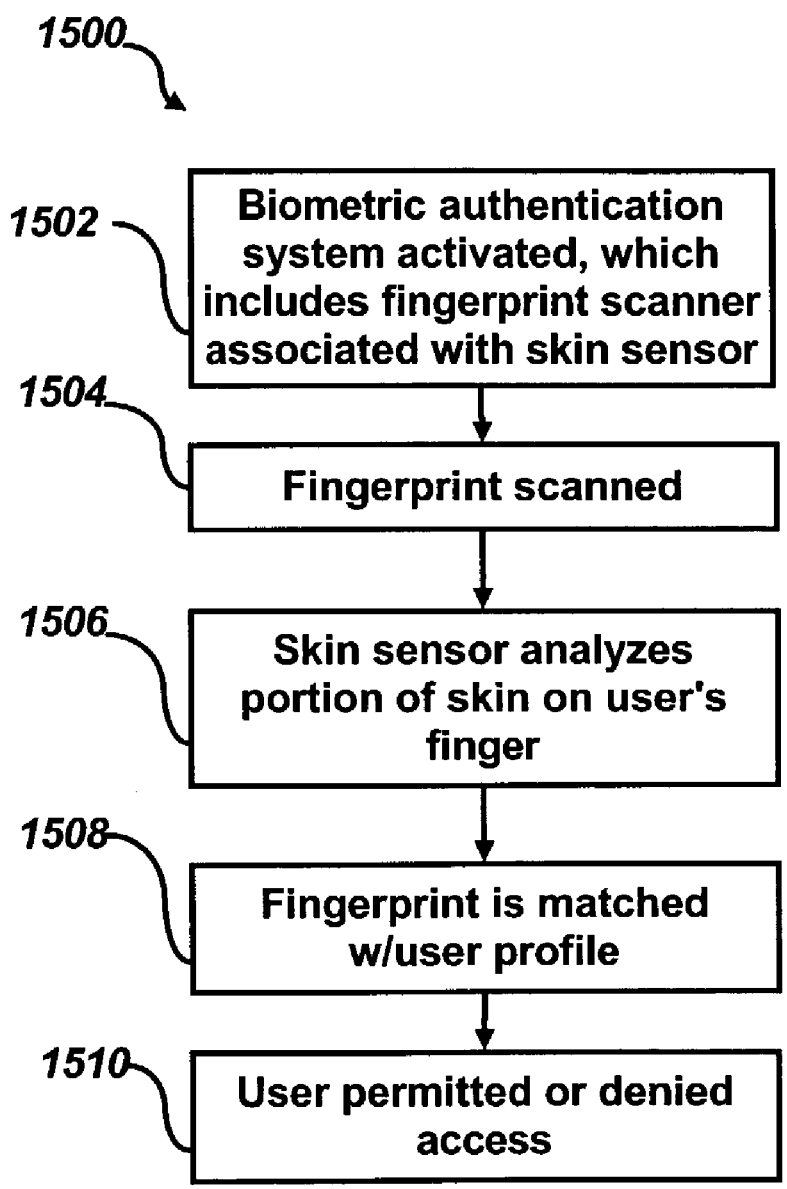
FIG. 15 depicts a high-level flow chart of operations illustrating logical operational steps, which can be implemented in accordance with an alternative embodiment of the present invention.

FIG. 15 depicts a high-level flow chart 1500 of operations illustrating logical operational steps, which can be implemented in accordance with an alternative embodiment of the present invention. As indicated at block 1502, a biometric authentication system, such as, for example, biometric authentication system 1000 or 1200, can be activated. As indicated previously, such a biometric authentication system can be configured to include, for example, a fingerprint scanner 1004 associated with a skin sensor 1006 (and/or skin sensors 1020, 1022 and/or 1024).

As illustrated thereafter at block 1504, a fingerprint of a user is scanned utilizing fingerprint scanner 1004. Next, as depicted at block 1506, a skin sensor 1006, either alone or in association with sensors 1020, 1022, and/or 1024 analyzes a portion of skin on the user's finger. Next, as illustrated at block 1508, the user's fingerprint is matched with/or against a user profile associated with the user. The user profile can be stored within a database associated with a biometric authentication system 1000 or 1200. The database can also be stored remotely at a server in communication with such the biometric authentication system 1000 or 1200. User authentication 40 can then take place, as depicted at block 1510.

Figure 16:
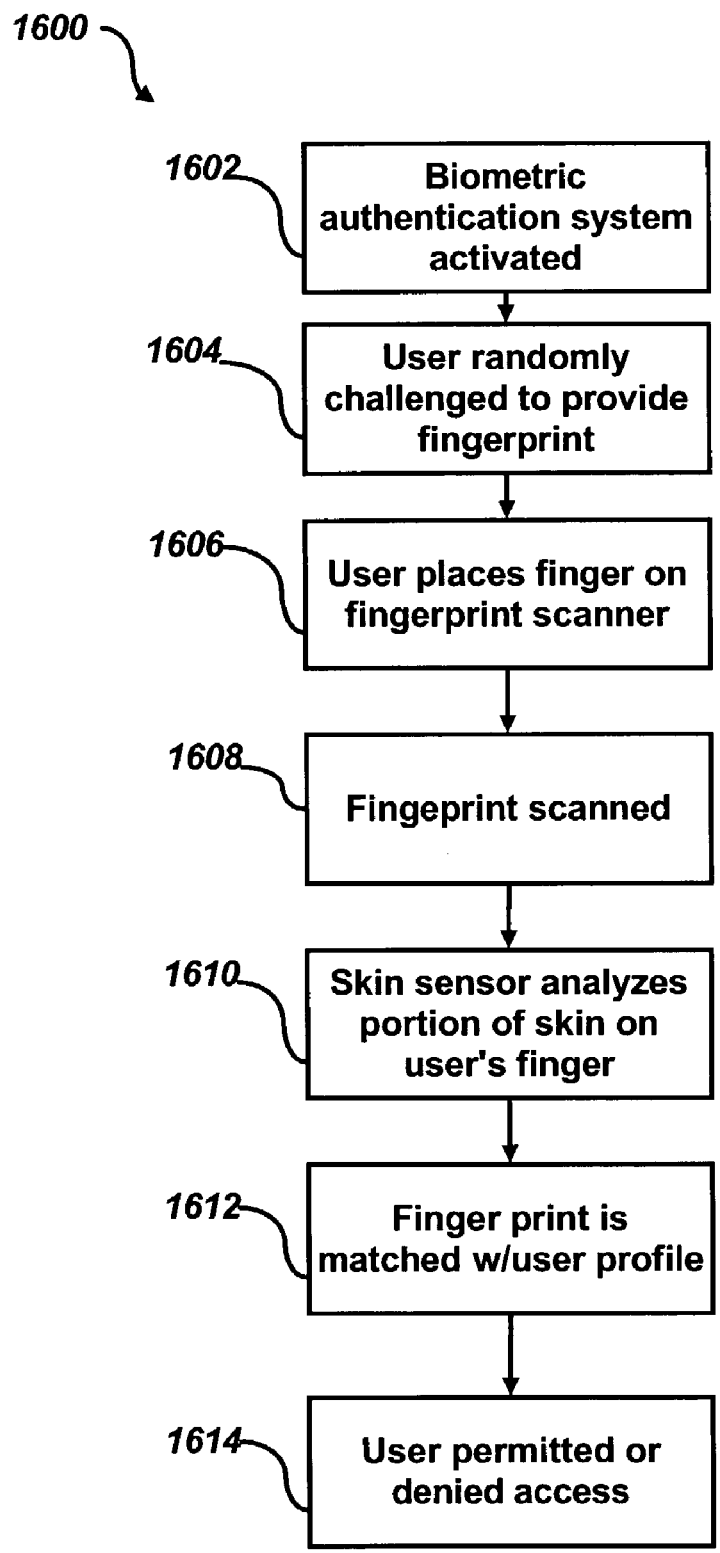
FIG. 16 illustrates a high-level flow chart of operations illustrating logical operational steps, which can be implemented in accordance with an alternative embodiment of the present invention.

FIG. 16 depicts a high-level flow chart 1600 of operations illustrating logical operational steps, which can be implemented in accordance with an alternative embodiment of the present invention. As indicated at block 1602, a biometric authentication system, such as, for example, biometric authentication system 1000 or 1200, can be activated. As indicated previously, such a biometric authentication system can be configured to include, for example, a fingerprint scanner 1004 in layered or integrated associated with another sensor (e.g., skin sensor 1006 and/or skin or biomedical sensors 1020, 1022 and/or 1024).

As illustrated thereafter at block 1604, the user can be randomly challenged to provide a fingerprint. For example, the user can be randomly challenged to provide a fingerprint from his or left index finger. Such a random challenge can also include subsequent random challenges. For example, the user can be randomly challenged to provide a fingerprint of his or her right thumb. Thus, the user places his or finger on the fingerprint scanner 1004 as illustrated at block 1606 and thereafter, as indicated at block 1608, the fingerprint can be scanned utilizing fingerprint scanner 1004.

Thereafter, as depicted at block 1610, a skin sensor 1006, either alone or in association with sensors 1020, 1022, and/or 1024 analyzes a portion of skin on the user's finger and/or pulse. Next, as illustrated at block 1508, the user's fingerprint is matched with/or against a user profile associated with the user. The user profile can be stored within a database associated with the biometric authentication system 1000 or 1200. The database can also be stored remotely at a server in communication with such the biometric authentication system 1000 or 1200. User authentication can then take place, as illustrated at block 1614.

Figure 17:
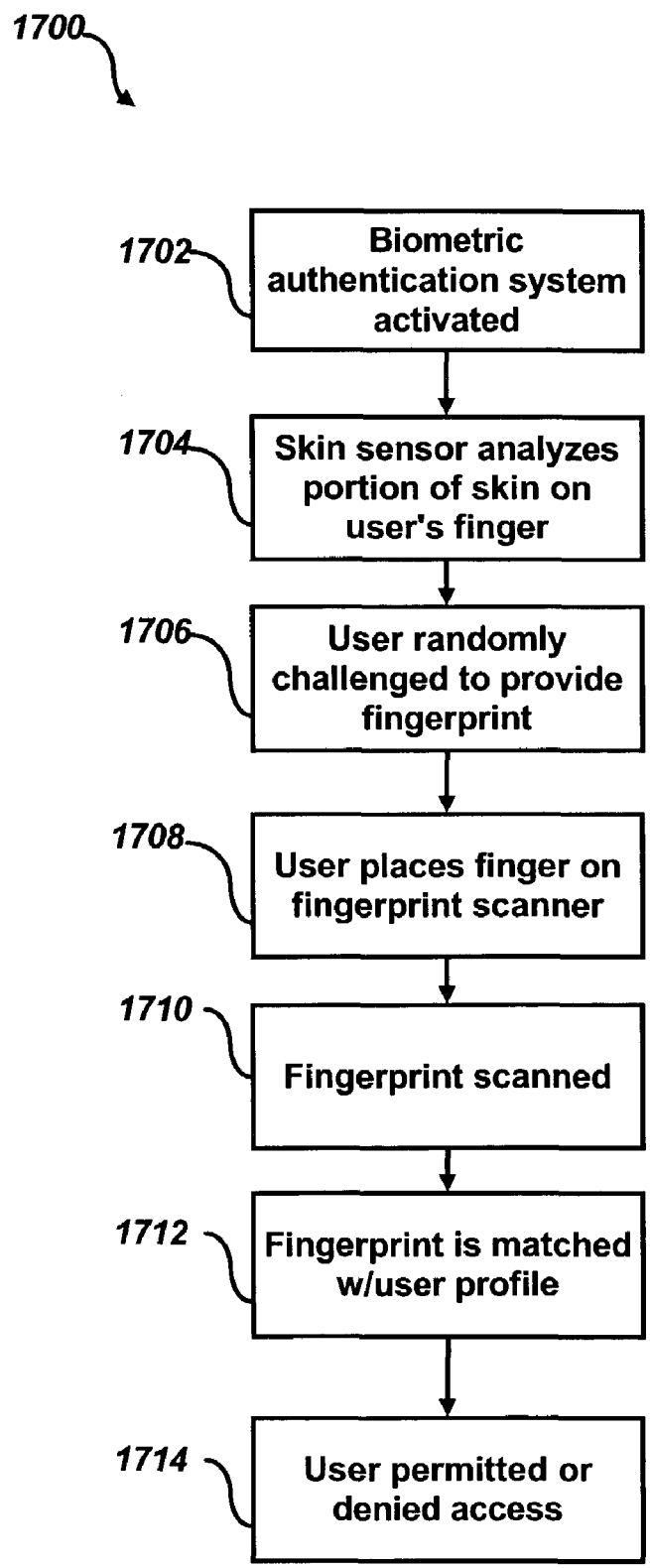
FIG. 17 depicts a high-level flow chart of operations illustrating logical operational steps, which can be implemented in accordance with an alternative embodiment of the present invention.

FIG. 17 depicts a high-level flow chart 1700 of operations illustrating logical operational steps, which can be implemented in accordance with an alternative embodiment of the present invention. As indicated at block 1702, a biometric authentication system, such as, for example, biometric authentication system 1000 or 1200, can be activated. As indicated herein, such a biometric authentication system can be configured to include, for example, a fingerprint scanner 1004 associated with a skin sensor 1006 (and/or skin sensors 1020, 1022 and/or 1024).

As illustrated thereafter at block 1704, a skin sensor 1006, either alone or in association with sensors 1020, 1022, and/or 1024 analyzes a portion of skin on the user's finger. Thereafter, as indicated at block 1706, the user is randomly challenged to provide a fingerprint. For example, the user can be randomly challenged to provide a fingerprint from his or left index finger. Such a random challenge can also include subsequent random challenges. For example, the user can be randomly challenged to provide a fingerprint of his or her right thumb. Thus, the user places his or finger on the fingerprint scanner 1004 as illustrated at block 1708 and thereafter, as indicated at block 1710, the fingerprint can be scanned utilizing fingerprint scanner 1004.

Next, as illustrated at block 1712, the user's fingerprint is matched with/or against a user profile associated with the user. The user profile can be stored within a database associated with the biometric authentication system 1000 or 1200. The database can also be stored remotely at a server in communication with such the biometric authentication system 1000 or 1200. User authentication can then take place, as indicated at block 1714.

Figure 18:
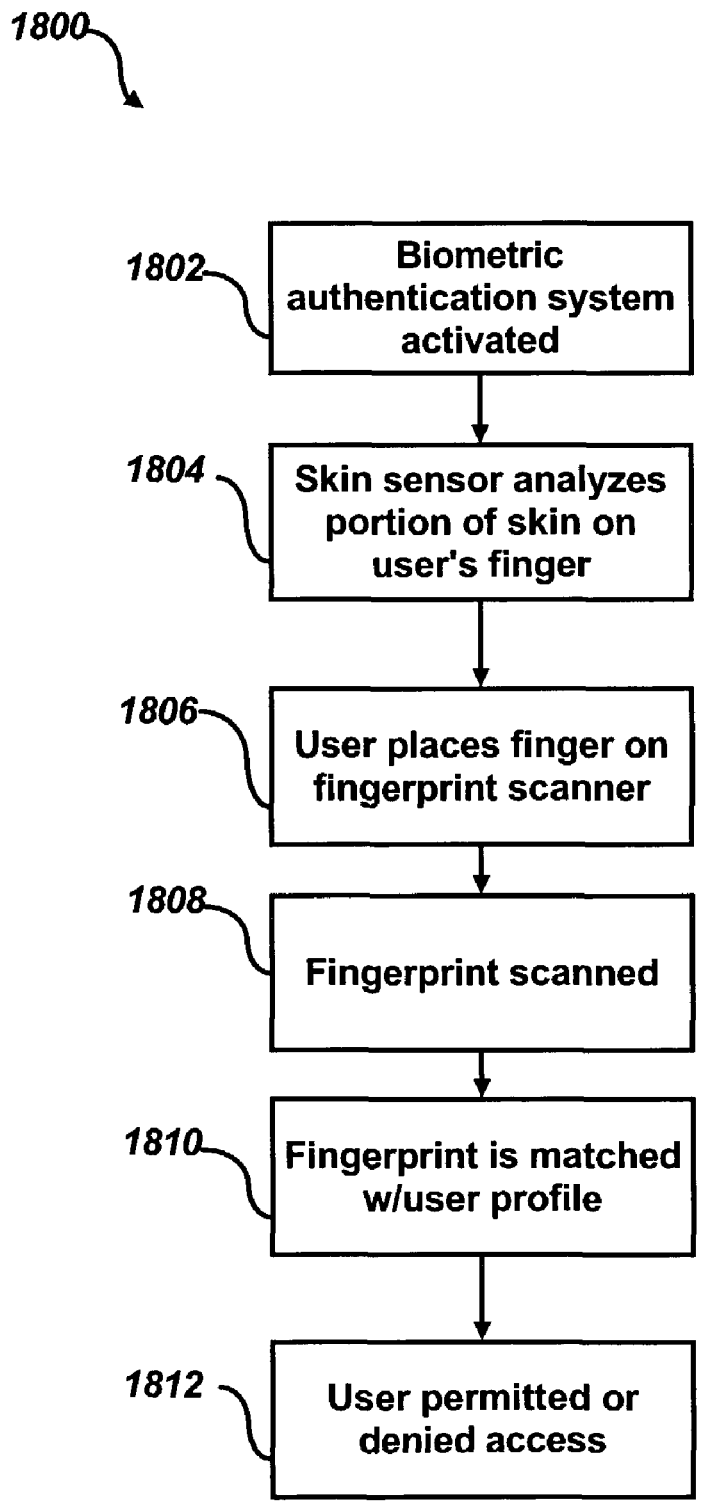
FIG. 18 illustrates a high-level flow chart of operations illustrating logical operational steps, which can be implemented in accordance with an alternative embodiment of the present invention.

FIG. 18 depicts a high-level flow chart 1800 of operations illustrating logical operational steps, which can be implemented in accordance with an alternative embodiment of the present invention. As indicated at block 1802, a biometric authentication system, such as, for example, biometric authentication system 1000 or 1200, can be activated. As indicated herein, such a biometric authentication system can be configured to include, for example, a fingerprint scanner 1004 associated with a skin sensor 1006 (and/or sensors 1020, 1022 and/or 1024).

Next, as indicated at block 1804, skin sensor 1006, either alone or in association with sensors 1020, 1022, and/or 1024 can analyze a portion of skin on the user's finger or search for a heart rate/pulse, depending on what type of sensor is being used (e.g., biomedical or skin) for sensors 1020, 1022 and 1024. The user then places his or finger on the fingerprint scanner 1004 as illustrated at block 1806 and thereafter, as indicated at block 1808, the fingerprint can be scanned utilizing fingerprint scanner 1004.

Next, as illustrated at block 1810, the user's fingerprint can be matched with/or against a user profile associated with the user. The user profile can be stored within a database associated with the biometric authentication system 1000 or 1200. The database can also be stored remotely at a server in communication with such the biometric authentication system 1000 or 1200. User authentication can then take place, as indicated at block 1812.

It should be appreciated that use of sensors 1006, 1020, 1022 and/or 1024 in methods as described in flow diagrams associated with FIGS. 15-18 is not limited with respect to the order for which skin or biomedical results are obtained from a sample. Skin and biomedical readings can be obtained initially (prior to fingerprint scanning), concurrently, during template retrieval, or after authentication. Skin and biomedical sensors can be active throughout the authentication process, as long as the user remains in contact with the user interface.

Figure 19:
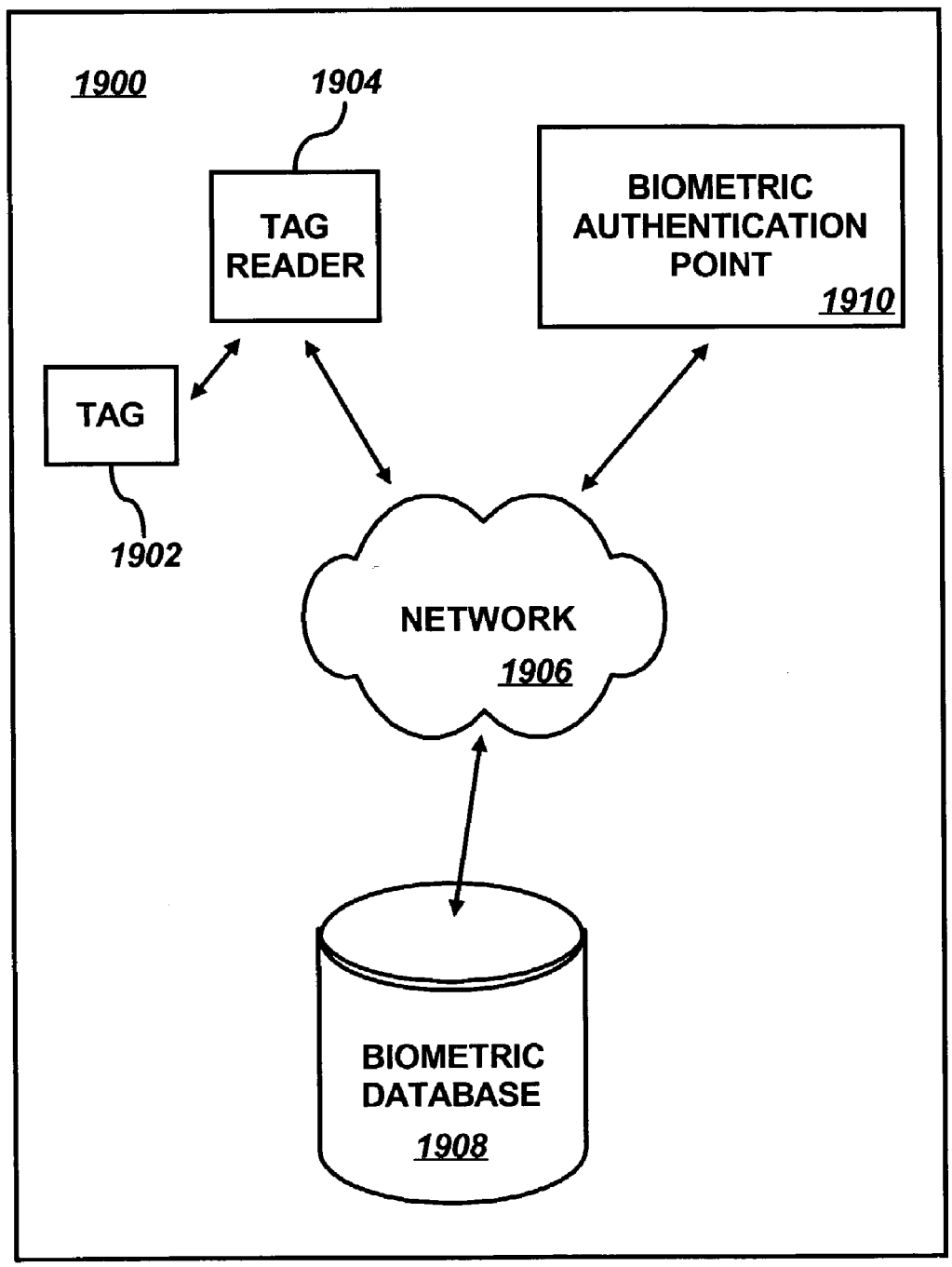
FIG. 19 depicts a system for biometrically authenticating a user in association with a wireless identification tag, in accordance with an alternative embodiment of the present invention.

FIG. 19 depicts a system 1900 for biometrically authenticating a user in association with a wireless identification tag, in accordance with an alternative embodiment of the present invention. System 1900 generally includes at least one wireless identification tag 1902, which can be identified by a tag reader 1904, which can be a wireless radio frequency transceiver such as a wireless access point familiar in with WiFi (e.g., 802.11) and cellular networking systems. System 1900 also includes at least one biometric authentication point 1910, which can be, for example, a biometric authentication apparatus or device, such as, for example, biometric authentication systems 200, 220, 240, 244, 1000, and/or 1200 disclosed herein.

Biometric authentication point 1910 can be, for example, a point of sale (POS) equipped with a biometric reader, which can randomly challenge a user to input biometric data for authentication purposes as disclosed herein. The biometric authentication point can also be an international border crossing, which is becoming important for Homeland Security initiatives passed into U.S. Federal Legislation in 2002. Other biometric authentication points that can benefit from advanced template retrieval, include public transportation (e.g., airport bordering systems), time and attendance equipment, building access, and any other application where a user can be waiting in line behind other users to be authenticated.

System 1900 permits a wireless identification tag, such as tag 1902, to provide the biometric authentication point with appropriate biometric template information obtained from a biometric database 1908 associated with the user through a network 1906 (i.e., wireless and/or wireline) so that when the holder of the identified tag 1902 is ready to be biometrically authorized, his or her biometric data can already be available to the system for a biometric challenge thereof.

Intelligent networks are mobile communications systems familiar to the wireless telecommunications industry for the use of Home Location Registers (HLRs) and Visiting Location Registers (VLRs) to enable a user's profile to follow the user throughout a network. The general methodologies behind intelligent networks can be used with the present invention to provide user biometric template in advance of authentication. In an intelligent network, a user's profile, which will generally include subscription services, billing information, voice mail, email, E911 location information, and other data, is kept at the HLR. The HLR is typically associated with the user's home network.

If the user leaves the network and enters another network, which is commonly referred to as "roaming," then a copy of the user's profile is placed into the VLR associated with the network within which the user is roaming. For example, this is what happens when a cellular phone user leaves Dallas, Tex. for a business trip to Los Angeles, Calif. The user is able to retrieve voice mail very shortly after turning on his or her mobile phone. After the device is turned on, the intelligent network determines that the user is visiting (roaming) and also determines where to get a copy of the user's profile.

It should be appreciated that a system similar to an intelligent network can be used in association with biometric authentication using existing networks and standards (e.g., LAN, WLAN, WiFi, Bluetooth, CDMA, TDMA, WAP, etc.) and networked servers and databases to provide for advanced biometric retrieval.

An example of a tagging system, which can be implemented in accordance with an alternative embodiment of the present invention is disclosed in U.S. Patent Application No. US 2002/0178063, "Community Concept for Payment Using RF ID Transponders," to Gravelle et al., which was published on Nov. 28, 2002, and which is incorporated herein by reference. It can be appreciated by those skilled in the art that U.S. Patent Application No. US 2002/0178063 does not limit the scope of the invention described herein, but is referenced for general edification and background purposes only.

Figure 20:
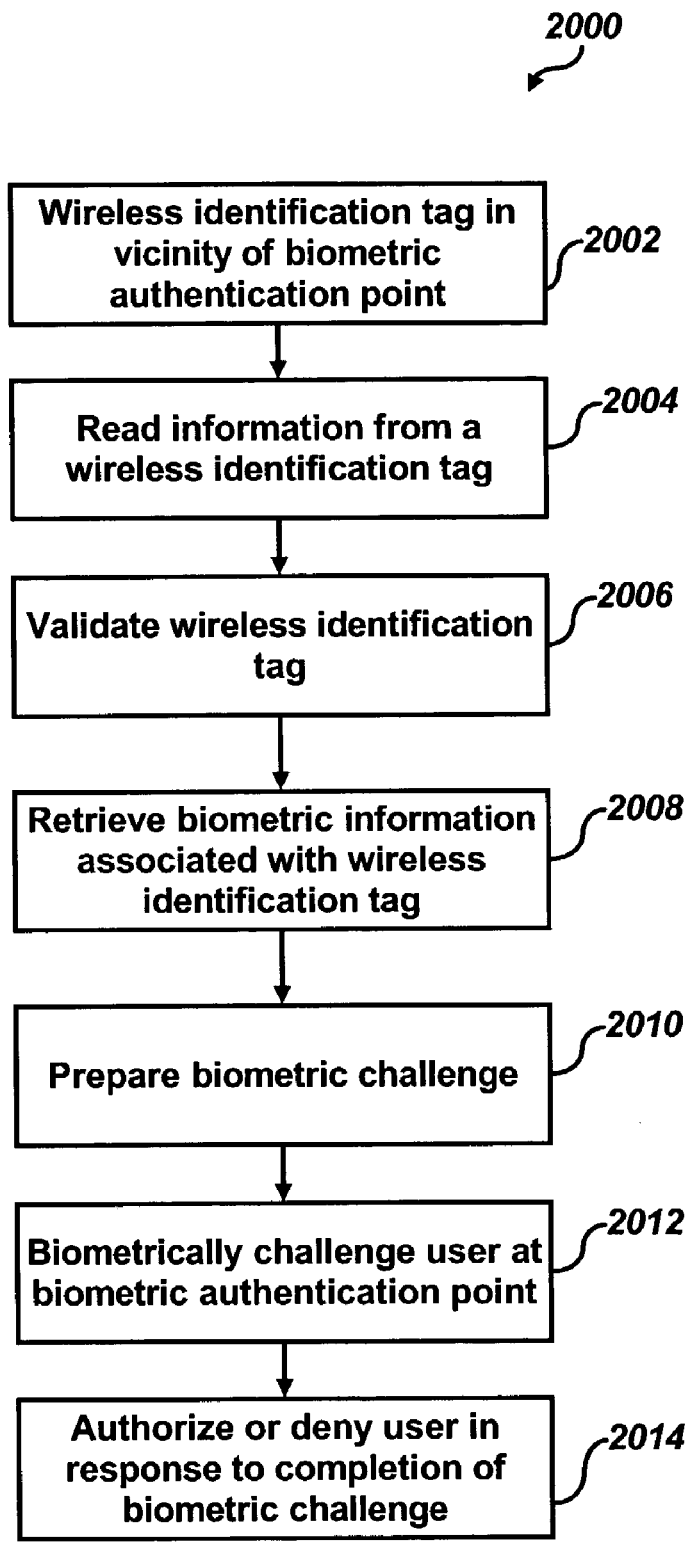
FIG. 20 illustrates a high-level flow chart of operations illustrating logical operational steps for biometrically authenticating a user in association with a wireless identification tag, in accordance with an alternative embodiment of the present invention.

FIG. 20 illustrates a high-level flow chart 2000 of operations illustrating logical operational steps for biometrically authenticating a user in association with a wireless identification tag, in accordance with an alternative embodiment of the present invention. As indicated at blocks 2000, and 2004 information from a wireless identification tag, such as tag 1902 of FIG. 19 can be read when the tag 1902 is located in the vicinity of biometric authentication point 1910. As indicated next at block 2006, the tag 1902 can be validated.

Thereafter, as indicated at block 2008, in response to validation of the tag 1902, biometric information associated with the user of tag 1902 can be retrieved from biometric database 1908 through a network 1906. This information is thus prepared for eventual use at the biometric authentication point, as indicated at block 2010. The user is then biometrically challenged at the biometric authentication point, as indicated at block 2012. The user is then denied or authorized, as indicated at block 2014, depending on the results of the biometric challenge.

Figure 21:
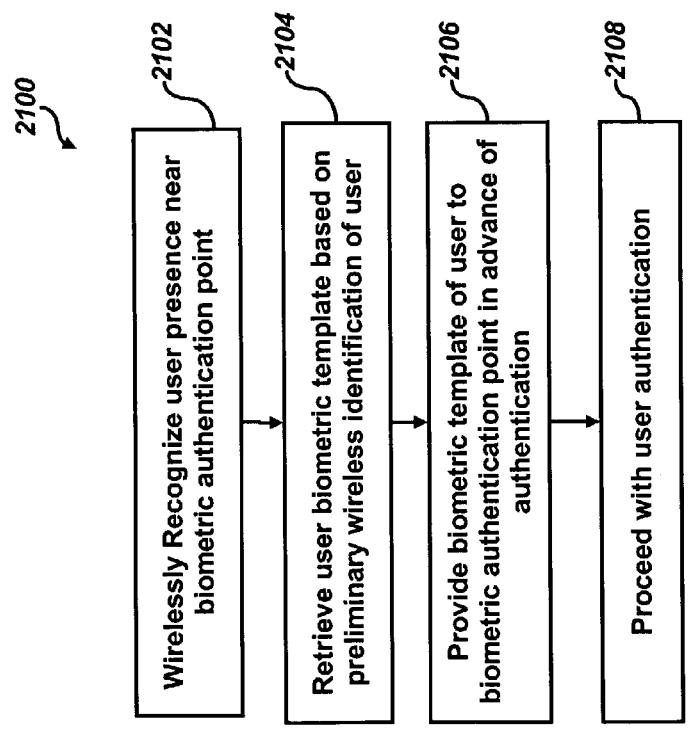
FIG. 21 depicts a high-level flow chart of operations illustrating logical operational steps for biometrically authenticating a user, in accordance with an alternative embodiment of the present invention.

FIG. 21 depicts a high-level flow chart 2100 of operations illustrating logical operational steps for biometrically authenticating a user, in accordance with an alternative embodiment of the present invention. As indicated at block 2102, the step of wirelessly recognizing the presence of a user near a biometric authentication point can be processed. In other words, the user is preliminarily identified by wireless means. Thereafter, as illustrated at block 2104, a biometric template associated with the user can be retrieved, based on the preliminary wireless identification of the user. Next, as depicted at block 2106, the biometric template associated with the user is provided in advance to the biometric authentication point in advance of the biometric authentication. Finally, as depicted at block 2108, the user can now be authenticated (or denied authorization), depending on the results of the biometric authentication process he or she will undergo via the biometric authentication point.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. For example, a variety of biometric attributes can be utilized in a variety of combinations and configurations to implement particular embodiments of the present invention.

Many modifications and variations are possible in light of the above teaching without departing from the spirit and scope of the following claims. It is contemplated that the use of varying embodiments of the present invention can involve components having different characteristics. It is intended that the scope of the present invention be defined by the claims appended hereto, giving full cognizance to equivalents in all respects.

The invention claimed is:

1. A method for the random biometric authentication of a user at a biometric authentication point in coordination with biometric data provided from a remote server after wireless identification of the user based on identification information provided from a portable electronic device carried by the user when the user is located near a random biometric authentication point, said method comprising the steps of:

provide an electronic system associated with a biometric authentication point which is further associated with at least one of: a point-of-sale, an ATM, a border entry, a boarding line for public transportation, a secured building, said electronic system including a biometric user interface, access to a data network and wireless communications hardware adapted to wirelessly communicate with portable electronic devices carried by users located near the biometric authentication point;

wirelessly accessing identification information for said user seeking access through said biometric authentication point by said electronic system from a portable electronic device carried by said user, said identification information including a user profile including user identification and a biometric template associated with said user;

comparing said identification information obtained wirelessly by said electronic system from said portable electronic device carried by said user with user profiles including identification and a biometric template accessible over said data network from at least one remote server to determine if user profile identification information wirelessly accessed from said portable electronic device match identification and said biometric template accessible by said electronic system from said at least one server;

providing identification and said biometric template from said server to said biometric authentication point in advance of user arrival at said biometric authentication point if said user profile identification information wirelessly accessed by said electronic system from said portable electronic device located near said biometric authentication point matches identification and said biometric template accessible by said electronic system from said at least one server;

determining if said user arrives at authentication point;

requesting said user to input into said biometric user interface at least one biometric attribute randomly selected from said biometric template accessed by said electronic system from said at least one remote server; and authenticating said user with said system and granting the user access through the biometric authentication point, if said at least one biometric attribute randomly selected for input by said user to said biometric user interface matches at least one biometric attribute randomly selected by said electronic system from said biometric template accessed by said electronic system from said at least one remote server.

2. The method of claim 1 wherein said attributes of said user include at least one of: fingerprint data, iris data, retina data, skin characteristics, voiceprint information, hand geometry, facial information, physical signature characteristics, biomedical attributes.

3. The method of claim 1 wherein said biometric attributes includes at least one of the following biometric skin attributes of said user: thickness of skin layers, morphology of skin interfaces, scattering properties due to collagen density and orientation, sex and age related compositional differences of skin, tissue hydration, and optical path length differences.

4. The method of claim 1 further comprising the step of:
maintaining said user profile in a database of user profiles, wherein said database is stored within a memory associated with said at least one server.

5. A method for the-random biometric authentication of a user utilizing unique biometric attributes associated with said user, said method comprising the steps of:

providing biometric authentication point with at least one of: a point-of-sale, an ATM, a border entry, a boarding line for public transportation, a secured building, said biometric authentication point including a biometric user interface, access to a data network and at least one remote server storing user identification information and biometric templates, and wireless communications hardware adapted to wirelessly communicate with portable electronic devices carried by users located near the biometric authentication point;

wirelessly recognizing a user presence near a biometric authentication point based on identification information wirelessly retrieved from a portable electronic device carried by said user;

identifying said user based on identification information wirelessly retrieved from said portable electronic device carried by said user;

retrieving a biometric template associated with said user from said at least one remote server based on said identification information provided by said portable electronic;

providing a user profile including a biometric template containing a plurality of biometric attributes of said user from said at least one remote server to said biometric authentication point in advance of proceeding with authentication of said user at said biometric authentication point;

proceeding with authentication of said user upon user arrival at said biometric authentication point by requesting said user to provide at least one biometric attribute randomly selected from said biometric template into a biometric user interface associated with said biometric authentication point;

automatically comparing said at least one biometric attribute randomly selected from said biometric template to a plurality of biometric attributes associated with said user and contained in said biometric template provided by said at least one remote server;

authenticating said user, if said at least one biometric attribute randomly selected from said biometric template for input by said user into said biometric user interface matches at least one of said plurality of biometric attributes associated with said user and contained in said biometric template accessed from said at least one remote server; and granting said user access to or through said biometric authentication point.

6. The method of claim 5 wherein the step of challenging said user and automatically comparing said at least one randomly selected biometric attribute associated with said user and contained in said biometric template further comprises the step of obtaining an optical sample of skin tissue provided by said user and analyzing a said optical sample of skin tissue for at least one tissue biometric attribute thereof associated with said user utilizing a skin sensor.

7. The method of claim 6 wherein said biometric user interface used in said step of challenging said user and automatically comparing said at least one randomly selected biometric attribute includes a skin sensor for use in said step of authentication of said user, and said skin sensor further adapted for collecting spectral information from tissue for performing biometric tasks.

8. The method of claim 5 wherein said at least one randomly selected biometric attribute comprises at least one of the following biometric attributes of said user: fingerprint data, iris data, retina data, skin characteristics, voiceprint information, hand geometry, facial information, physical signature characteristics, and tissue characteristics.

9. The method of claim 5 wherein said tissue biometric attribute of said user comprises at least one of the following tissue biometrics: thickness of skin layers, morphology of skin interfaces, scattering properties due to collagen density and orientation, sex and age related compositional differences of skin, tissue hydration, and optical path length differences.

10. An electronic system for securing access, said system comprising:
- a biometric user interface located at a biometric authentication access point associated with a user-desired activity including access to at least one of: a point-of-sale, an ATM, a border entry, a boarding line for public transportation, a secured building, and adapted to accept biometric attributes physically provided to said biometric user interface by users;
- wireless communications hardware associated with said biometric authentication access point, said wireless communications hardware including at least one of a wireless receiver and an RF1D tag reader, said wireless communications hardware adapted to recognize the presence of wireless devices carried by users near said biometric authentication access point and adapted to obtain user profile identification from said wireless devices for matching against a user profile stored in at least one remote database;
- access to said at least one remote server including a biometric database through a data network, said at least one remote server and said database adapted to contain user profiles including biometric attributes associated with the user profile identification information retrieved from said wireless devices and further adapted to provide user profiles including biometric attributes associated with the user profile identification information to said biometric authentication access point when user profile identification information is recognized by said remote server and said database via said wireless communications hardware;
- a biometric matching module located in at least one of said remote server or said biometric authentication access point adapted to permit a user to perform said user-desired activity if at least one biometric attribute physically provided by said user to said biometric user interface at said biometric authentication access point matches at least one biometric attribute selected by said electronic system from said at least one remote server and said database.

11. The electronic system of claim 10 wherein said biometric user interface is adapted to read at least one of the following biometric attributes provided by said user: fingerprint data, iris data, retina data, skin characteristics, voiceprint information, hand geometry, facial information, and physical signature characteristics.

12. The system of claim 10 further comprising:
module for subsequently prompting said user to input to said biometric_user interface at least one additional biometric attribute selected by said electronic system from said at least one remote server if at least one biometric attribute previously input by said user to said biometric user interface associated with said electronic system does not match said at least one biometric attribute previously input by said user.

13. The system of claim 10 further comprising:
- a software module for identifying at least one defective biometric attribute associated with said user; and
- wherein said system is adapted by said software_module whereby said user is thereafter prompted to input to said electronic system at least one additional biometric attribute selected from a user profile containing biometric attributes of said user contained in said at least one remote server.

14. The method of claim 1 wherein said biometric user interface is adapted to read at least one of the following biometric attributes provided by said user: fingerprint data, iris data, retina data, skin characteristics, voiceprint information, hand geometry, facial information, and physical signature characteristics.

15. The method of claim 1 wherein said electronic system comprises at least one of: a wireless device; a computer workstation, an automated teller machine, a secured entry, a wireless network.

16. The method of claim 1 wherein said user-desired activity comprises at least one of: an ATM transaction, access to a border entry, access to public transportation, access to a building, access to a secure area, access to a computer network, a financial transaction, access to data from said electronic system, execution of a mechanical activity.

17. The method of claim 1 wherein said portable electronic device is at least one of: a smart card, PDA, cellular telephone, an RFID tag.

18. The method of claim 5 wherein said plurality of biometric attributes of said user contained in said biometric template includes at least one of the following biometric skin attributes of said user: thickness of skin layers, morphology of skin interfaces, scattering properties due to collagen density and orientation, sex and age related compositional differences of skin, tissue hydration, and optical path length differences.

19. The method of claim 5 wherein said biometric user interface is adapted to read at least one of the following biometric attributes provided by said user: fingerprint data, iris data, retina data, skin characteristics, voiceprint information, hand geometry, facial information, and physical signature characteristics.

20. The method of claim 5 wherein said electronic system comprises at least one of: a wireless device; a computer workstation, an automated teller machine, a secured entry, a wireless network.

21. The method of claim 5 wherein said user-desired activity comprises at least one of: an ATM transaction, access to a border entry, access to a building, access to a secure area, access to public transportation, access to a computer network, a financial transaction, access to data from said electronic system, execution of a mechanical activity.

22. The method of claim 5 wherein said portable electronic device is at least one of: a smart card, PDA, cellular telephone, an RFID tag.

23. The system of claim 10 wherein said biometric attribute is randomly selected by said electronic system from said at least one remote server 24. The system of claim 23 further comprising:
- a software module for subsequently prompting said user to input to said biometric user interface at least one additional biometric attribute randomly selected by said electronic system from said at least one remote server if at least one biometric attribute previously input by said user to said biometric user interface associated with said electronic system does not match said at least one biometric attribute previously input by said user.

25. The system of claim 10 further comprising:
a software module for identifying at least one defective biometric attribute associated with said user; and
wherein said system is adapted by said software module whereby said user is thereafter prompted to input to said electronic system at least one additional biometric attribute randomly selected from a user profile containing biometric attributes of said user.

26. A method for authenticating user identification and granting user passage through a secured access point, said method comprising the steps of:
providing an electronic system at a secured access point, said electronic system including a biometric user interface, access to a data network and wireless communications hardware adapted to wirelessly communicate with portable electronic devices carried by users located near the secured access point;
wirelessly recognizing user presence near a biometric authentication point based on identification information wirelessly retrieved from a portable electronic device carried by the user;
wirelessly retrieving identification information associated with the user from said portable electronic device carried by said user;
retrieving a user profile, including a biometric template containing a plurality of biometric attributes associated with the user, from at least one remote server through said data network based on said identification information wirelessly received from said portable electronic device;
providing a user profile to said electronic system in advance of proceeding with authentication of the user by said biometric user interface at said secured entry point;
proceeding with authentication of the user upon user arrival of the secured access point by requesting the user to physically provide at least one biometric attribute into said biometric user interface associated with said secured access point;
automatically comparing said at least one biometric attribute physically provided by the user into said biometric user interface to a plurality of biometric attributes associated with the user and contained in said biometric template;
authenticating the user if said at least one biometric attribute input by the user into said biometric user interface matches at least one of said plurality of biometric attributes associated with the user and contained in said biometric template; and
granting the user passage through said secured entry point if the user has been authenticated.

27. Said method for authenticating user identification and granting user passage through a secured access point in claim 26, wherein said secured access point includes at least one of: a point-of-sale, an ATM, a border entry, a boarding line for public transportation, a secured building.

28. Said method for authenticating user identification and granting user passage through a secured access point in claim 26, wherein authentication of the user includes:
proceeding with authentication of the user upon user arrival at said biometric authentication point by requesting the user to physically provide at least one biometric attribute randomly selected from said biometric template into said at said biometric user interface associated with said secured access point;
automatically comparing said at least one biometric attribute randomly selected from said biometric template to a plurality of biometric attributes associated with the user and contained in said biometric template; and
authenticating the user if said at least one biometric attribute randomly selected from said biometric template for physical input by the user into said biometric user interface matches at least one of said plurality of biometric attributes associated with the user and contained in said biometric template.

* * * * *